(12) United States Patent
Tokunaka

(10) Patent No.: US 11,097,696 B2
(45) Date of Patent: Aug. 24, 2021

(54) WASHER NOZZLE

(71) Applicant: MITSUBA Corporation, Gunma (JP)

(72) Inventor: Hiroki Tokunaka, Gunma (JP)

(73) Assignee: MITSUBA Corporation, Gunma (JP)

( * ) Notice: Subject to any disclaimer, the term of this patent is extended or adjusted under 35 U.S.C. 154(b) by 94 days.

(21) Appl. No.: 16/231,610

(22) Filed: Dec. 24, 2018

(65) Prior Publication Data

US 2019/0232923 A1 Aug. 1, 2019

(30) Foreign Application Priority Data

Feb. 1, 2018 (JP) .............................. JP2018-016499

(51) Int. Cl.
| | | |
|---|---|---|
| *B60S 1/56* | (2006.01) | |
| *B60S 1/52* | (2006.01) | |
| *B60R 1/00* | (2006.01) | |
| *B05B 1/02* | (2006.01) | |
| *B60R 11/04* | (2006.01) | |
| *G02B 27/00* | (2006.01) | |

(52) U.S. Cl.
CPC .................. *B60S 1/56* (2013.01); *B05B 1/02* (2013.01); *B60R 1/00* (2013.01); *B60R 11/04* (2013.01); *B60S 1/52* (2013.01); *G02B 27/0006* (2013.01)

(58) Field of Classification Search
CPC .. B05B 1/02; B05B 1/04; B05B 1/044; B05B 1/048; B05B 1/10; B05B 1/26; B05B 1/262; B05B 1/265; B05B 1/267; B05B 1/3404; B60S 1/52; B60S 1/56; B60R 1/00; B60R 11/04; G02B 27/0006
See application file for complete search history.

(56) References Cited

U.S. PATENT DOCUMENTS

| | | | | |
|---|---|---|---|---|
| 9,309,995 | B2 * | 4/2016 | Bell ........................ | E04D 13/08 |
| 2006/0201561 | A1 * | 9/2006 | Clift ....................... | E03C 1/0404 |
| | | | | 137/801 |
| 2009/0250533 | A1 * | 10/2009 | Akiyama .................. | B60S 1/58 |
| | | | | 239/284.1 |
| 2017/0073128 | A1 * | 3/2017 | Crawford ............. | B65D 47/123 |
| 2018/0186342 | A1 * | 7/2018 | Kubota .................. | H04N 5/225 |

FOREIGN PATENT DOCUMENTS

JP 2011240920 12/2011

* cited by examiner

*Primary Examiner* — David G Cormier
(74) *Attorney, Agent, or Firm* — JCIPRNET

(57) ABSTRACT

Provided is a washer nozzle that since a plurality of stepped portions (stepped wall portions) formed in a stepped shape in a flow direction of the cleaning liquid are provided in a flow path between an inflow hole and a discharge port in a main body portion, it is possible to spread the cleaning liquid in a width direction of the flow path by causing the cleaning liquid flowing from an upstream side to collide with stepped surfaces of the plurality of stepped portions one after another. Therefore, even when a flow rate of the cleaning liquid is small, without increasing a discharge capacity of a washer pump, it is possible to disperse the cleaning liquid fully in the width direction of the flow path, and it is possible to uniformly discharge the cleaning liquid to substantially the entire surface of an imaging lens.

6 Claims, 13 Drawing Sheets

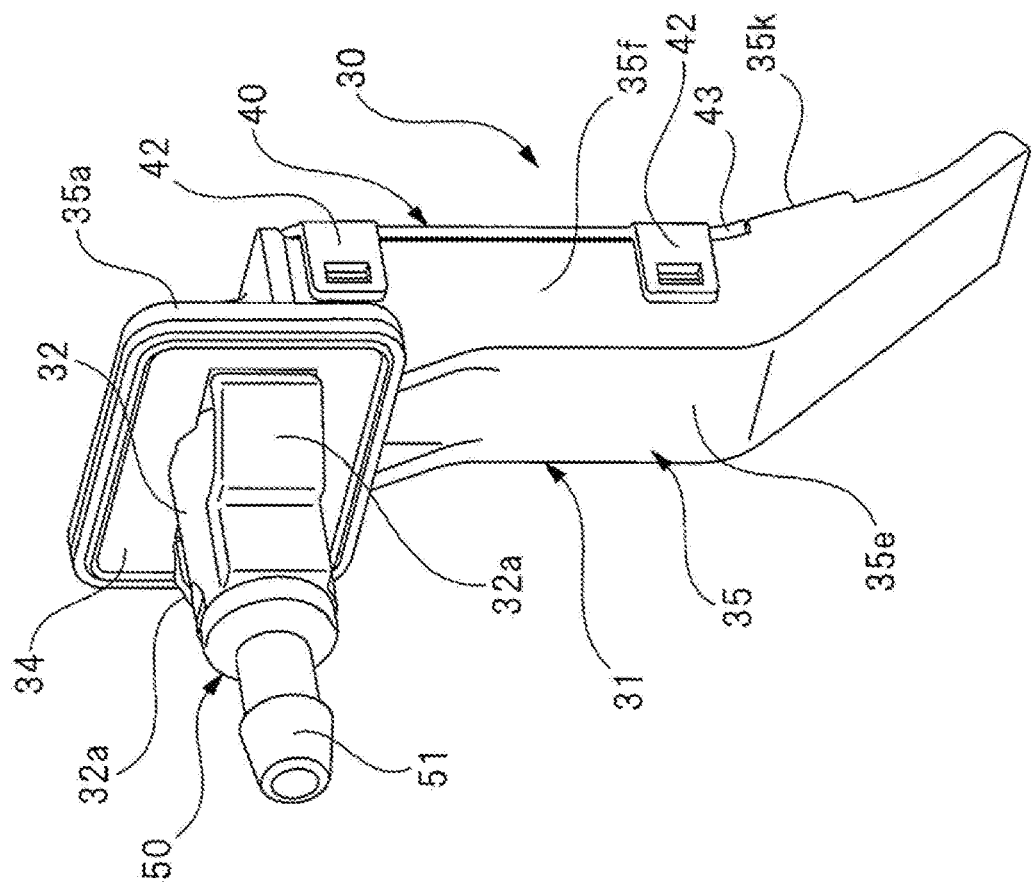
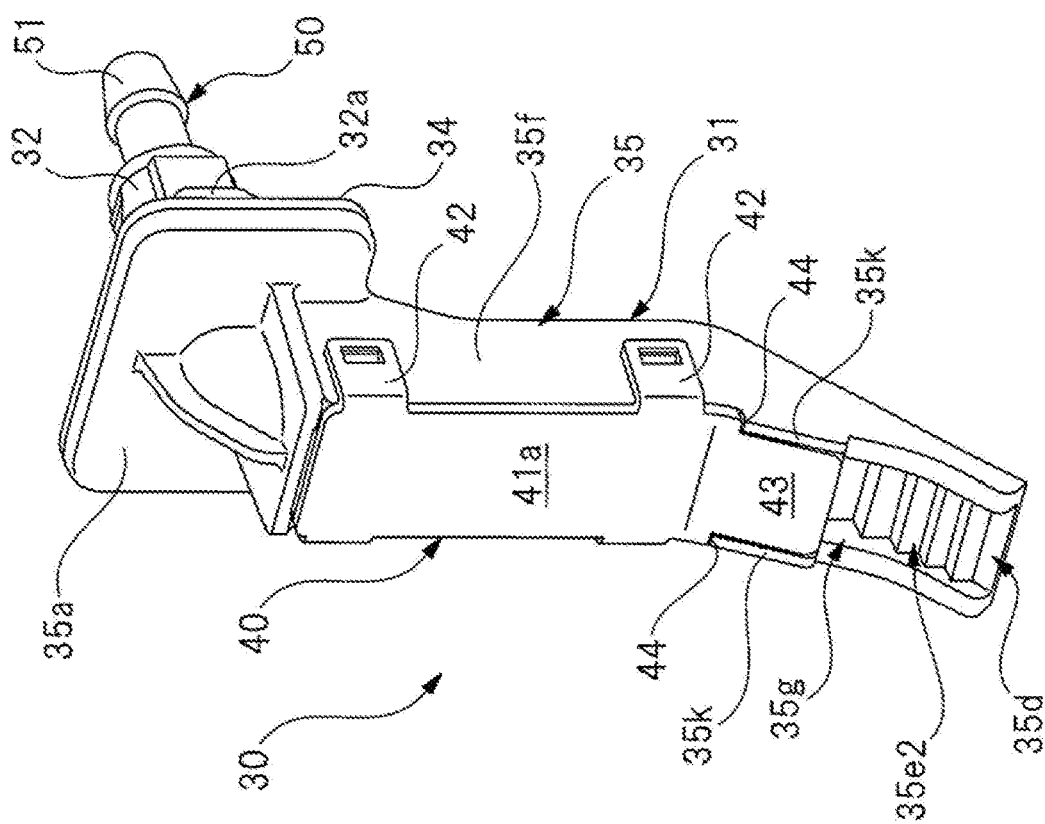
FIG. 2A
FIG. 2B

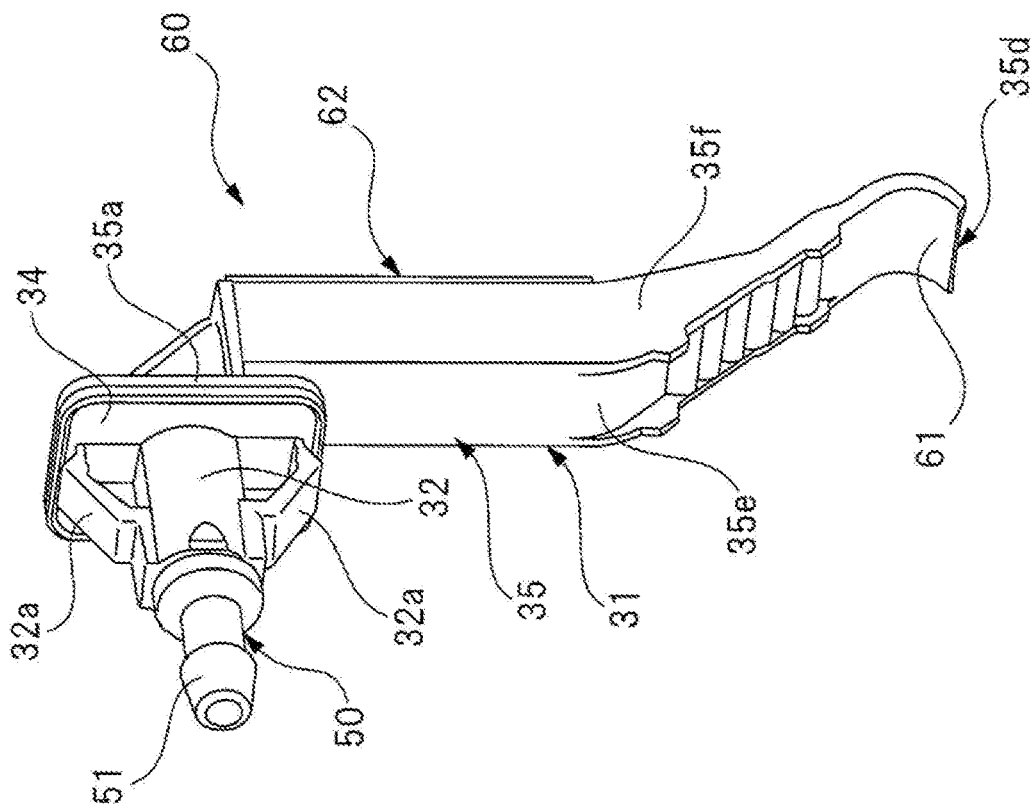
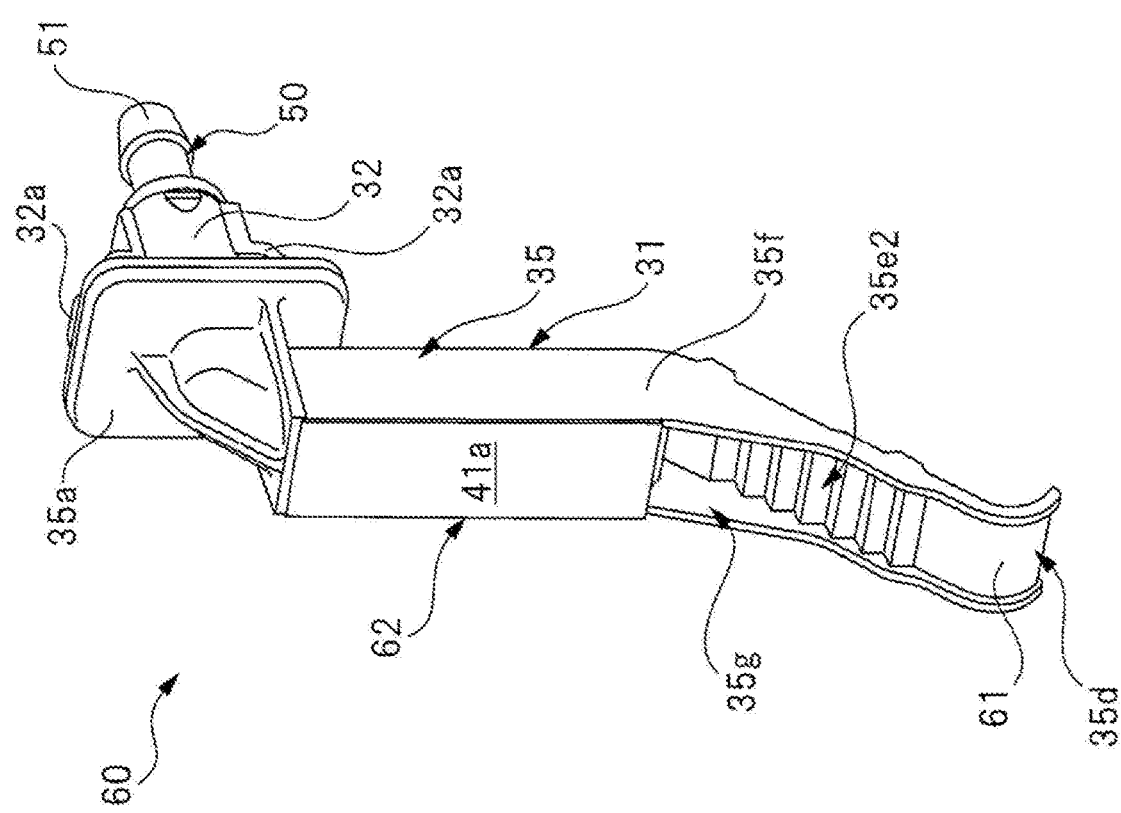

US 11,097,696 B2

WASHER NOZZLE

CROSS-REFERENCE TO RELATED APPLICATION

This application claims the priority of Japan patent application serial no. 2018-016499, filed on Feb. 1, 2018. The entirety of the above-mentioned patent application is hereby incorporated by reference herein and made a part of this specification.

BACKGROUND

Technical Field

The disclosure relates to a washer nozzle for supplying a cleaning liquid to an object to be cleaned.

Description of Related Art

Conventionally, there is a technique in which an in-vehicle camera is mounted on a rear of a vehicle such as an automobile and the rear of the vehicle is imaged by the in-vehicle camera so that the vehicle can safely reverse while the rear of the vehicle can be checked with a monitor in a vehicle interior. For example, Patent Document 1 describes an optical sensor (in-vehicle camera) for imaging a rear of a vehicle, and a cleaning nozzle (washer nozzle) for spraying a cleaning liquid which cleans a lens (an imaging lens) is provided in the optical sensor.

PATENT DOCUMENTS

[Patent Document 1] Japanese Laid-open No. 2011-240920

However, in the technique described in the above-described Patent Document 1, there is a problem that a width dimension of a discharge portion (an injection port) of the washer nozzle is as small as approximately ⅓ of a diameter dimension of the imaging lens of the in-vehicle camera and it is difficult to evenly spread the cleaning liquid over an entire area of the imaging lens. Therefore, it is conceivable to simply increase the width dimension of the discharge portion of the washer nozzle, but in this case, a flow rate of the cleaning liquid in the discharge portion may become insufficient, and for example, the cleaning liquid being biased toward one side of the discharge portion in a width direction may occur. Therefore, a method for uniformly dispersing the cleaning liquid flowing through the discharge portion in the width direction is required. Although increasing a discharge capacity of a pump may be conceived in this case, this is not realistic because it leads to increase in the size of the apparatus.

SUMMARY

The disclosure provides a washer nozzle capable of evenly discharging a cleaning liquid to substantially an entire area of an object to be cleaned without increasing a discharge capacity of a pump.

In an aspect of the disclosure, there is provided a washer nozzle which supplies a cleaning liquid to an object to be cleaned, including a main body portion having a flow path through which the cleaning liquid flows, an inflow portion provided on an upstream side of the flow path, a discharge portion provided on a downstream side of the flow path, and a plurality of stepped portions provided in the flow path and formed in a stepped shape in a flowing direction of the cleaning liquid.

BRIEF DESCRIPTION OF THE DRAWINGS

FIGS. 2A and 2B are perspective views showing the washer nozzle of FIG. 1 as a single body.

FIGS. 9A and 9B are perspective views corresponding to FIGS. 2A and 2B which show a washer nozzle according to a second embodiment.

DESCRIPTION OF THE EMBODIMENTS

Hereinafter, a first embodiment of the disclosure will be described in detail below with reference to the drawings.

Figure 1:
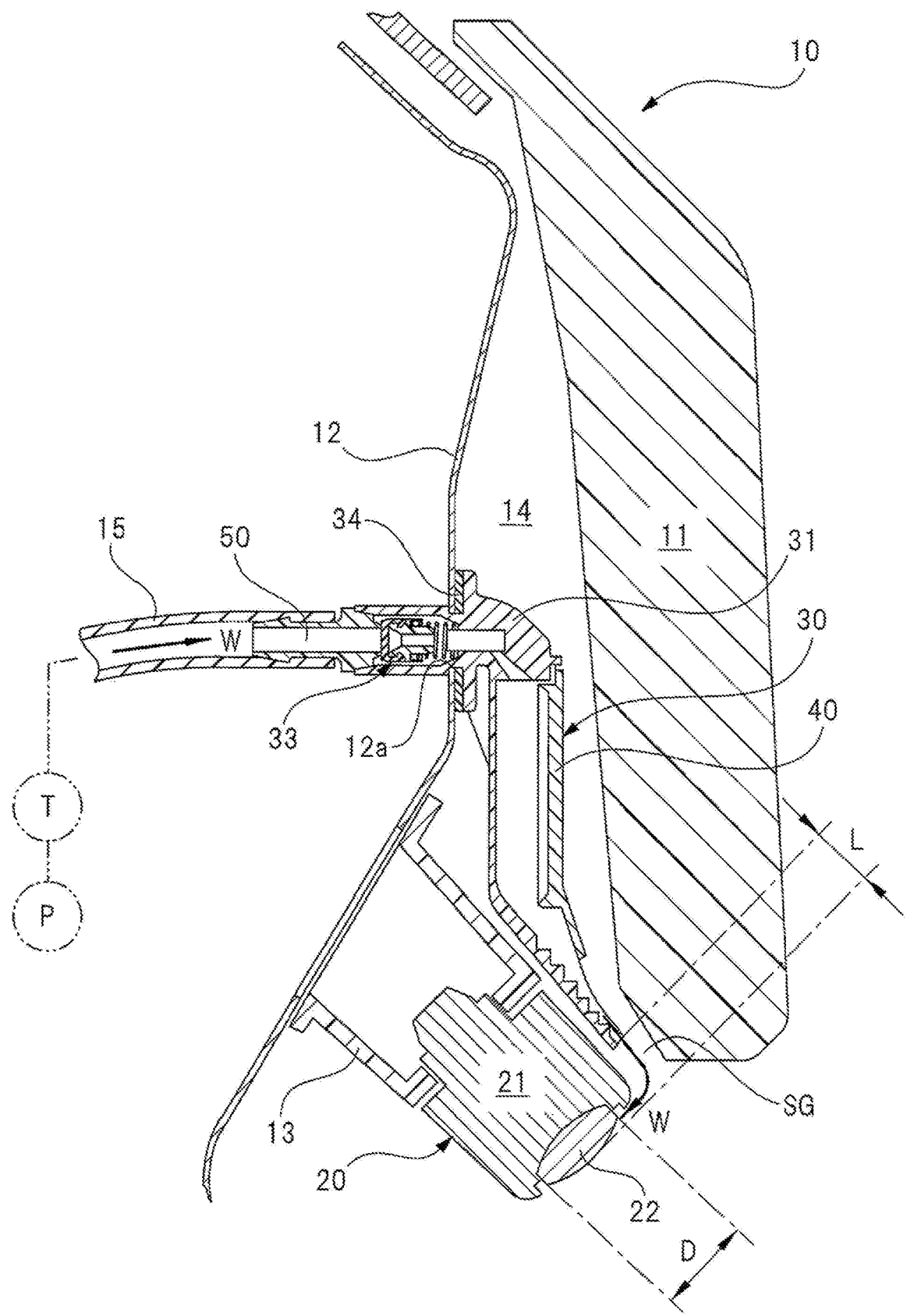
FIG. 1 is a partially enlarged cross-sectional view showing a rear side of a vehicle having a washer nozzle according to the disclosure.
Figure 3:
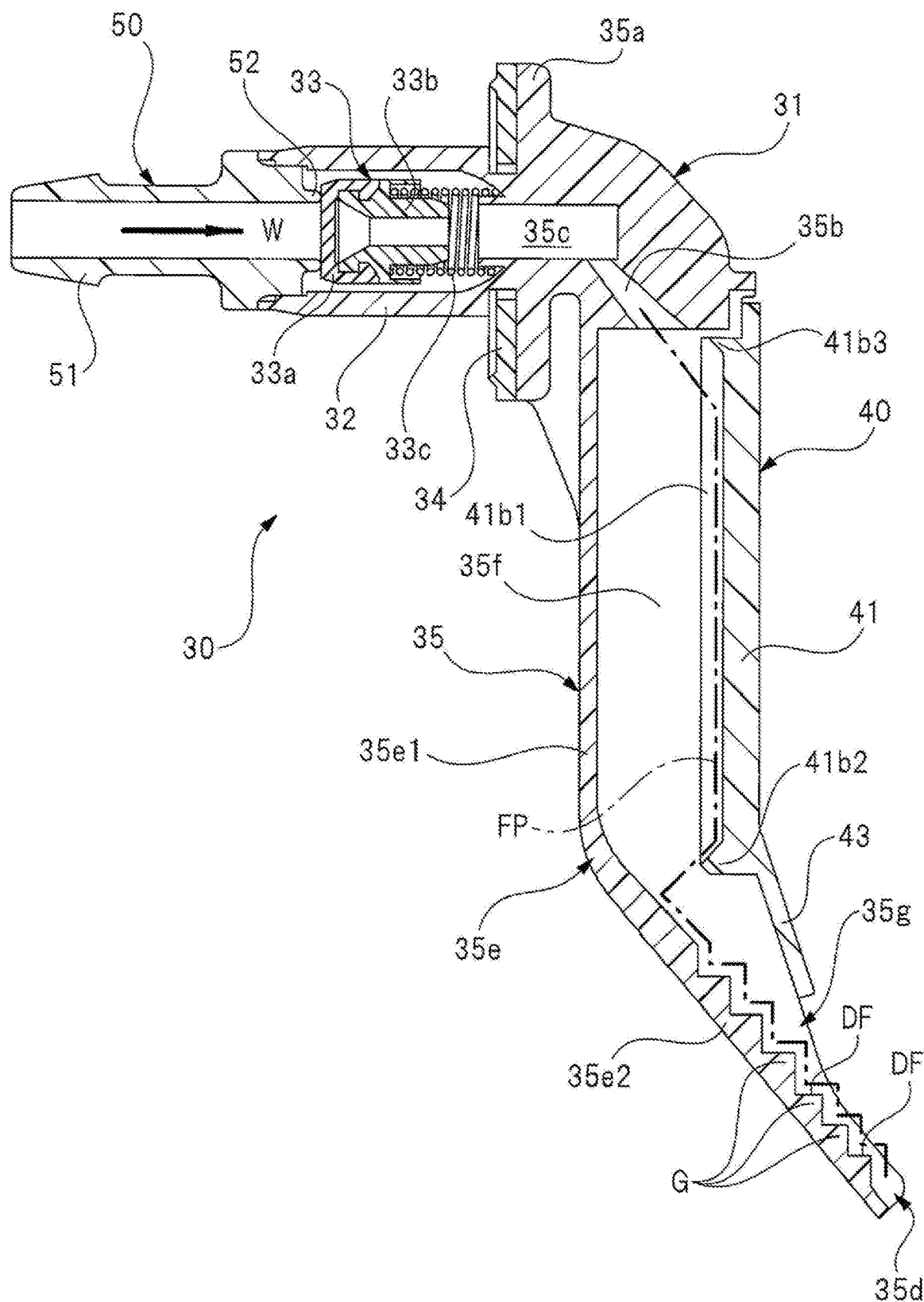
FIG. 3 is a cross-sectional view corresponding to FIG. 1 which shows the details of the washer nozzle of FIGS. 2A and 2B.
Figure 4A:
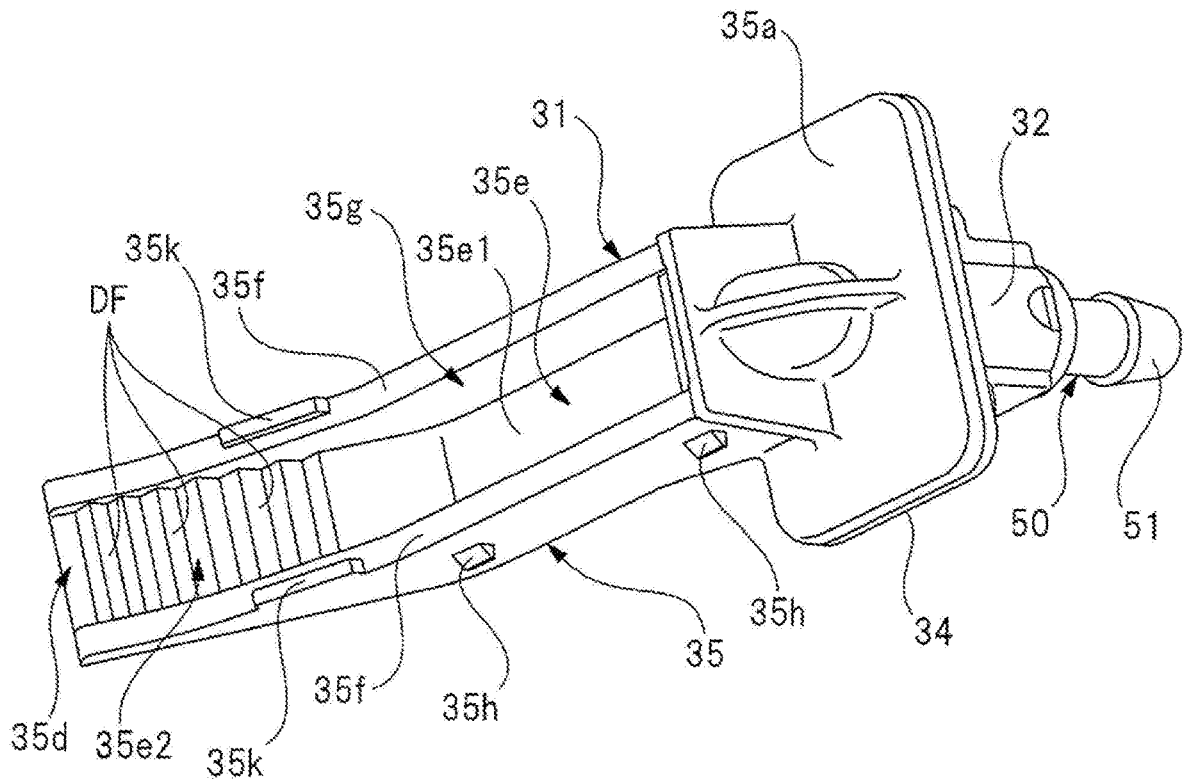
FIGS. 4A and 4B are perspective views showing a main body portion of the washer nozzle as a single body.
Figure 4B:
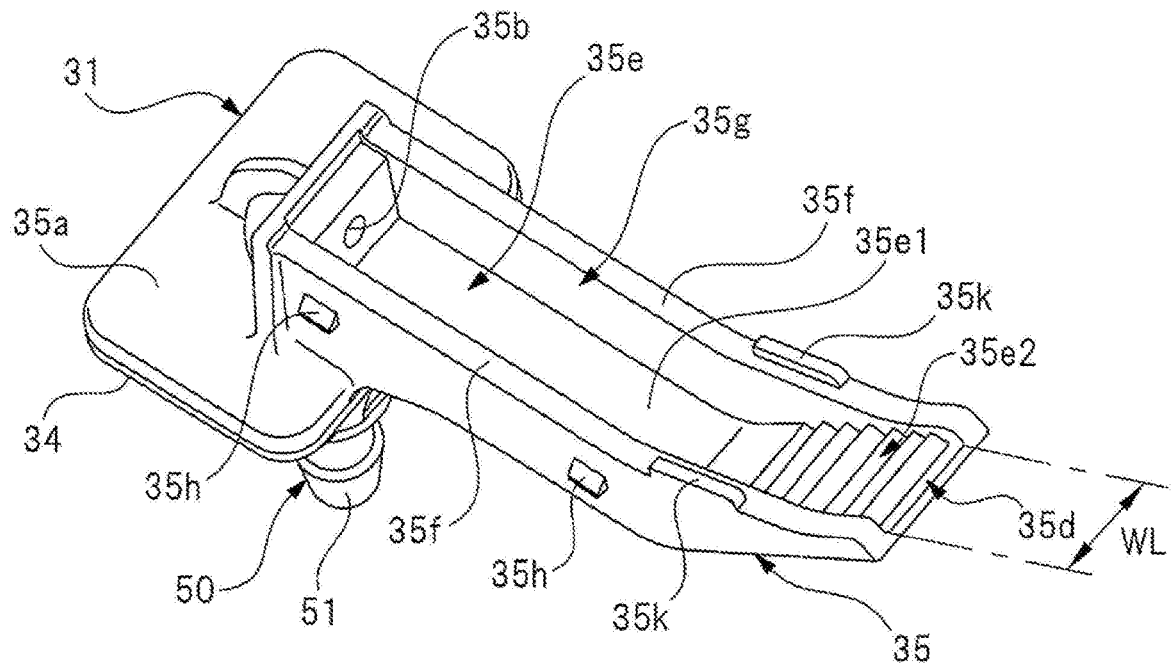
Figure 5A:
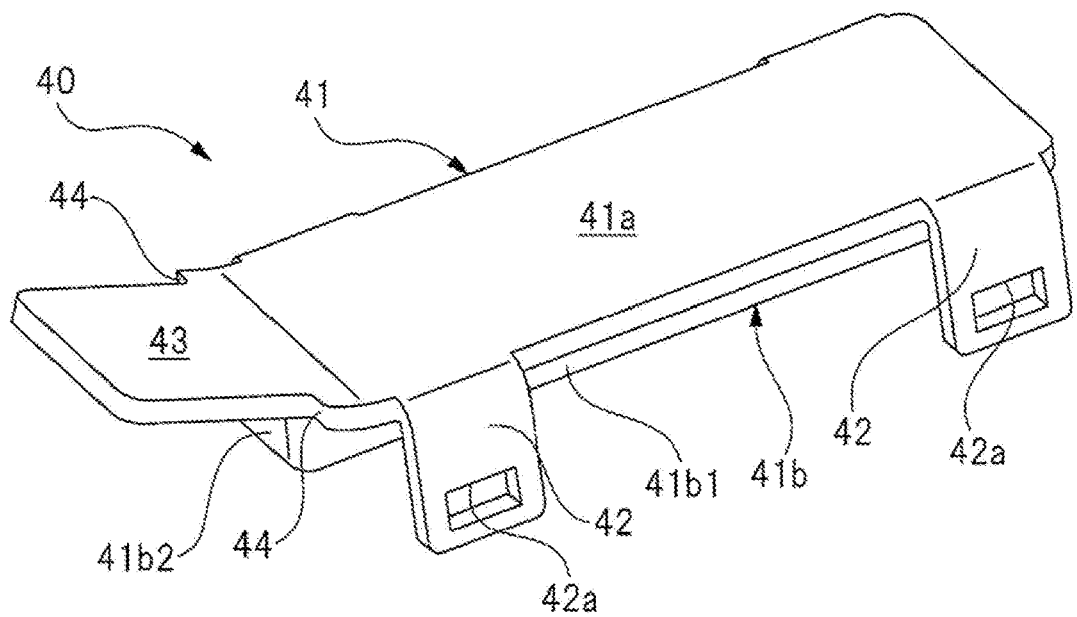
FIGS. 5A and 5B are perspective views showing a cover member of the washer nozzle as a single body.
Figure 5B:
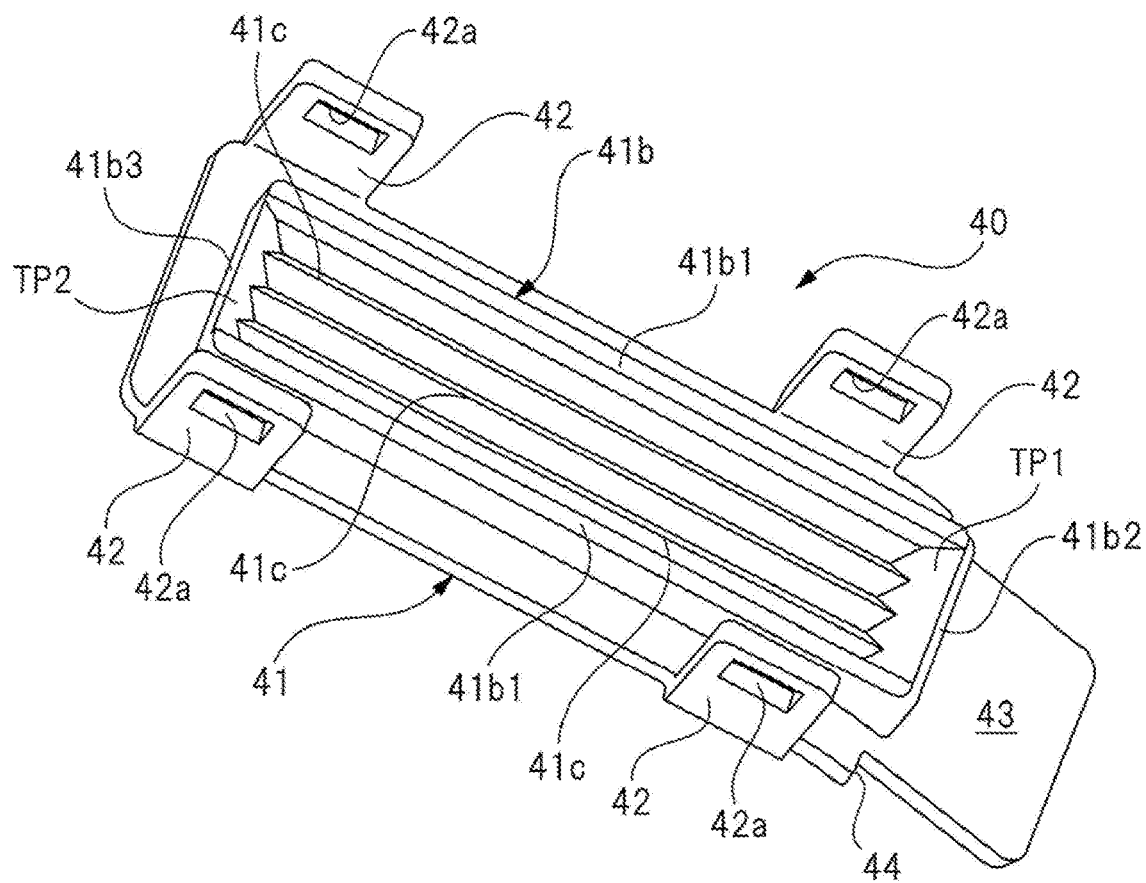
Figure 6:
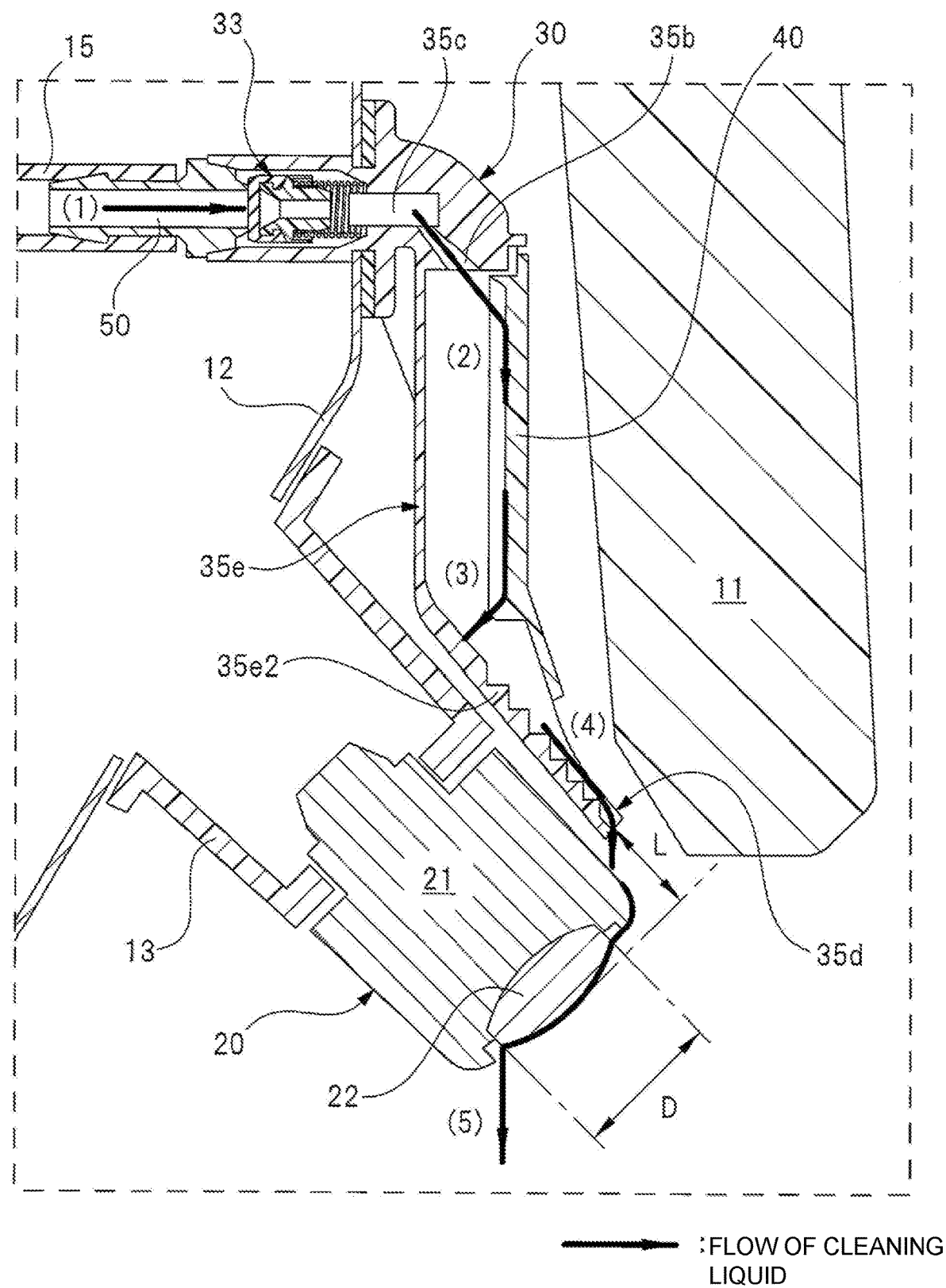
FIG. 6 is an enlarged cross-sectional view corresponding to FIG. 1 which explains a flow state of the cleaning liquid.
Figure 7:
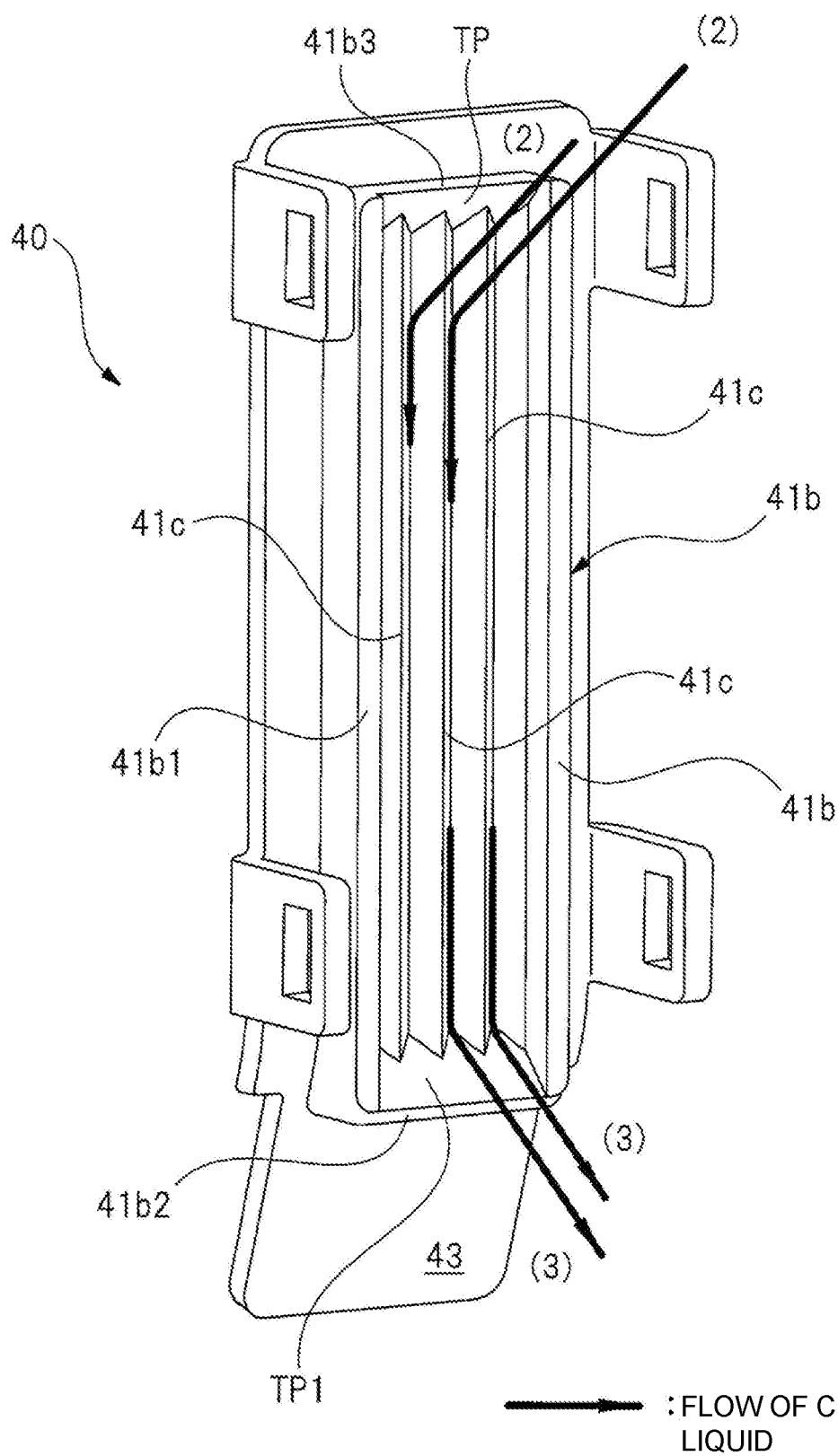
FIG. 7 is a perspective view explaining the flow state of the cleaning liquid along the cover member.
Figure 8:
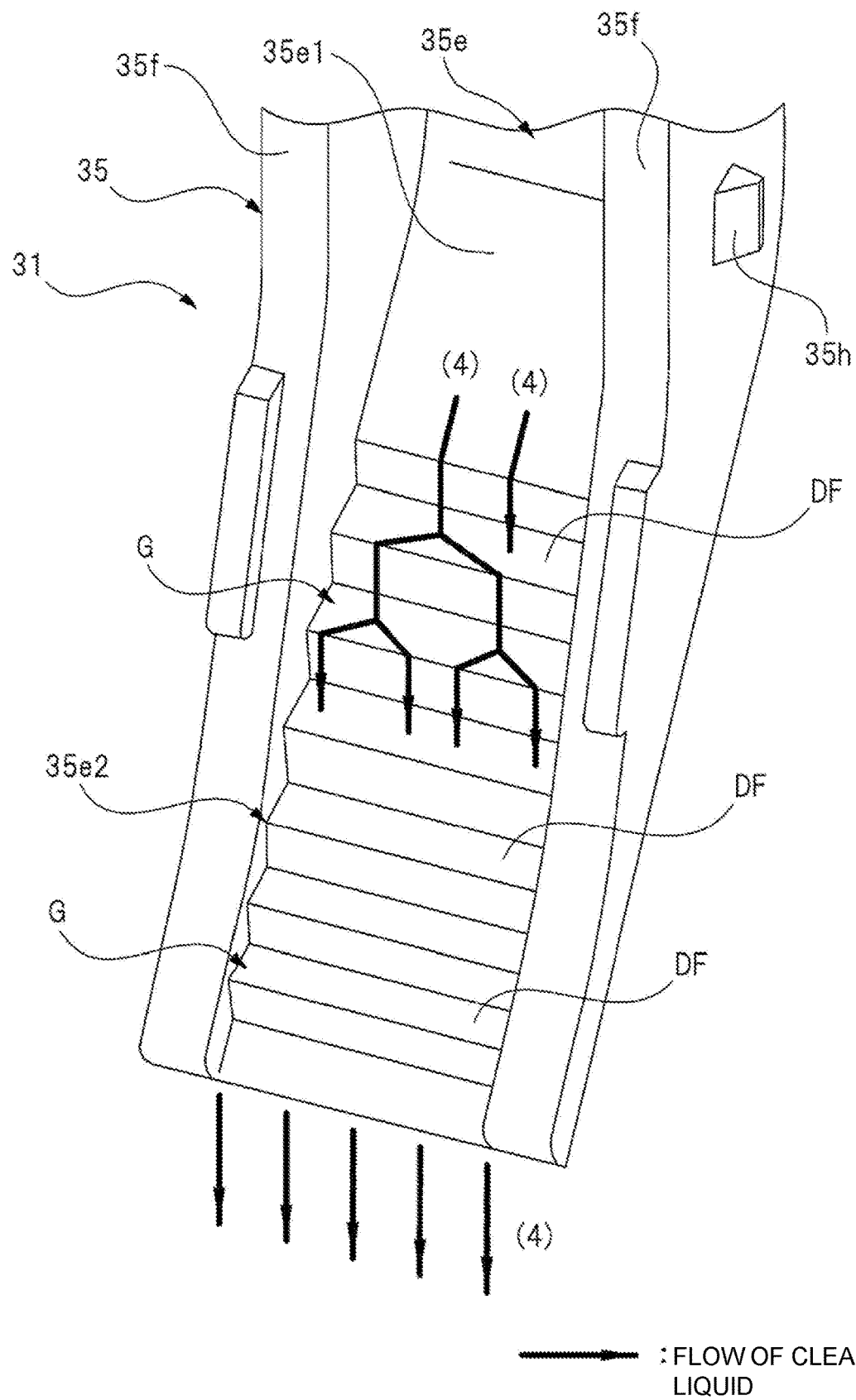
FIG. 8 is a perspective view explaining a dispersion state of the cleaning liquid in a stepped portion.

FIG. 1 is a partially enlarged cross-sectional view showing a rear side of a vehicle having a washer nozzle according to the disclosure, FIGS. 2A and 2B are perspective views showing the washer nozzle of FIG. 1 as a single body, FIG. 3 is a cross-sectional view corresponding to FIG. 1 which shows the details of the washer nozzle of FIGS. 2A and 2B, FIGS. 4A and 4B are perspective views showing a main body portion of the washer nozzle as a single body, FIGS. 5A and 5B are perspective views showing a cover member of the washer nozzle as a single body, FIG. 6 is an enlarged cross-sectional view corresponding to FIG. 1 which explains a flow state of the cleaning liquid, FIG. 7 is a perspective view explaining the flow state of the cleaning liquid along the cover member, and FIG. 8 is a perspective view explaining a dispersion state of the cleaning liquid in a stepped portion.

As shown in FIG. 1, an in-vehicle camera 20 for imaging a lower side immediately behind the vehicle 10 which is a dead angle of the vehicle 10 is installed on a rear of the vehicle 10 such as an automobile. The in-vehicle camera 20 includes a camera body 21 formed in substantially a cubic shape, and an imaging lens 22 fixed to the camera body 21.

The in-vehicle camera 20 is disposed in the vicinity of a license plate (not shown) on the rear of the vehicle 10 and is capable of imaging a relatively wide angle of view on the rear of the vehicle 10. Further, the in-vehicle camera 20 is disposed to be hidden by a lower end of a rear garnish 11 decorating the rear of the vehicle 10 such that it is inconspicuous. Therefore, tampering with the in-vehicle camera 20 is curbed.

The in-vehicle camera 20 is fixed to a bracket 13 fixed to a vehicle body 12 of the vehicle 10, thereby enabling imaging of a predetermined angle of view without shaking. Additionally, an image captured by the in-vehicle camera 20 is displayed on a monitor (such as a monitor of a car navigation system) in a vehicle interior. Here, an operation timing of the in-vehicle camera 20 is a time when a shift operation is "R (reverse)" in both an automatic transmission (AT) vehicle and a manual transmission (MT) vehicle. That is, when the vehicle 10 moves backward, the in-vehicle camera 20 is operated to allow checking of the rear of the vehicle 10.

A narrow installation space 14 is formed between the vehicle body 12 of the vehicle 10 and the rear garnish 11. A washer nozzle 30 for supplying a cleaning liquid W to the imaging lens 22 of the in-vehicle camera 20 is accommodated in this installation space 14. That is, the imaging lens 22 is an object to be cleaned in the disclosure. Additionally, the washer nozzle 30 is formed in an elongated shape to extend along a shape of the narrow installation space 14 in a longitudinal direction.

One side (an upper side in the drawing) of the washer nozzle 30 in the longitudinal direction is fixed to the vehicle body 12 above the bracket 13. On the other hand, the other side (a lower side in the drawing) of the washer nozzle 30 in the longitudinal direction is a portion at a minute gap SG between the camera body 21 and the rear garnish 11 and is disposed in the vicinity of the imaging lens 22.

Here, as shown in FIG. 1, the other side of the washer nozzle 30 in the longitudinal direction, that is, a portion of a discharge port 35d (refer to FIGS. 4A and 4B) of the washer nozzle 30 is disposed on a rear side (a diagonally upper left side in the drawing) of the imaging lens 22 in an imaging direction of the in-vehicle camera 20. Specifically, the portion of the discharge port 35d of the washer nozzle 30 and the imaging lens 22 are spaced apart from each other by a separation distance L. Therefore, the other side of the washer nozzle 30 in the longitudinal direction is prevented from entering the angle of view of the imaging lens 22.

Further, one side of a washer tube 15 having flexibility in the longitudinal direction is connected to one side of the washer nozzle 30 in the longitudinal direction. Also, a washer tank T for storing the cleaning liquid W and a washer pump P for delivering the cleaning liquid W stored in the washer tank T to the washer tube 15 are connected to the other side of the washer tube 15 in the longitudinal direction. Therefore, the cleaning liquid W is discharged from the washer nozzle 30 by an operation of the washer pump P.

Here, an operation timing of the washer pump P is, for example, a time when a wiper switch is in an "ON" state at the time of rain or the like and a shift operation is "R." Therefore, it is possible to capture a clear image by removing water droplets or the like attaching on the imaging lens 22. However, the operation timing of the washer pump P is not limited to the operation timing as described above, and for example, it may be freely operated according to the intention of the driver when operating a dedicated switch (not shown) for cleaning an imaging camera provided in the vehicle interior.

As shown in FIGS. 2A and 2B to 5A and 5B, the washer nozzle 30 includes a main body portion 31 formed in substantially an L shape, a cover member 40 which closes a part of an opening portion 35g (refer to FIGS. 4A and 4B) in the main body portion 31, and a joint member 50 to which one side of the washer tube 15 (refer to FIG. 1) in a longitudinal direction is connected.

The main body portion 31 is formed in substantially an L shape by injection molding of molten plastic or the like, and a flow path FP (indicated by a single-dotted-dashed line in FIG. 3) through which the cleaning liquid W (refer to FIG. 1) flows is formed therein. A cylindrical accommodating portion 32 is formed on a side of the joint member 50 in the longitudinal direction of the main body portion 31, that is, on an upstream side of the flow path FP. A base end side of the joint member 50 is fixed to one side of the cylindrical accommodating portion 32 in an axial direction by welding or the like. On the other hand, the other side of the cylindrical accommodating portion 32 in the axial direction is integrated with a flow path forming portion 35 which occupies most of the main body portion 31.

Here, the joint member 50 is a hollow pipe formed of a resin material such as plastic, and the cleaning liquid W flows therein. Additionally, a large diameter portion 51 is formed on a tip end side (a left side in FIG. 3) of the joint member 50. Therefore, one side of the washer tube 15 in the longitudinal direction is caught by the large diameter portion 51 and is locked to the joint member 50.

On the other hand, an annular valve seat 52 is formed on a base end side (a right side in FIG. 3) of the joint member 50. A valve body 33a of a check valve 33 is separated from or seated on the valve seat 52.

The check valve 33 opening and closing in the axial direction of the cylindrical accommodating portion 32 is accommodated inside the cylindrical accommodating portion 32. The check valve 33 is formed to open from the joint member 50 side to the flow path forming portion 35 side. That is, the check valve 33 allows only a flow of the cleaning liquid W (refer to FIG. 1) from the washer pump P side to the in-vehicle camera 20 side.

Thus, when the washer pump P is stopped, a backflow of air into the washer tube 15 is prevented, and it is possible to immediately discharge the cleaning liquid W from the washer nozzle 30 toward the in-vehicle camera 20 at the time of a next operation of the washer pump P.

Here, the check valve 33 includes the valve body 33a formed of an elastic material such as rubber to have substantially a bowl shape, and a valve base 33b formed of plastic or the like. Additionally, a valve spring 33c is provided between the valve base 33b and the flow path forming portion 35 side of the cylindrical accommodating portion 32. The valve spring 33c presses (closes) the valve body 33a mounted on the valve base 33b toward the valve seat 52 of the joint member 50 at a predetermined pressure.

Thus, when an internal pressure of the washer tube 15 rises due to the operation of the washer pump P, the check valve 33 is opened. Therefore, the cleaning liquid W flows toward the flow path FP.

Also, as shown in FIG. 2B, a pair of hooking claws 32a are provided on an outer side of the cylindrical accommodating portion 32 in a radial direction. These hooking claws 32a are provided at intervals of 180° around the cylindrical accommodating portion 32 and are elastically deformable in the radial direction of the cylindrical accommodating portion 32. Additionally, the pair of hooking claws 32a are hooked on the vehicle body 12 by passing the cylindrical accommodating portion 32 through an engaging hole 12a (refer to FIG. 1) of the vehicle body 12 while the pair of hooking claws 32a are elastically deformed. Accordingly, one side of the washer nozzle 30 in the longitudinal direction is fixed to the vehicle body 12.

Further, as shown in FIGS. 2A and 2B to 4A and 4B, a flange portion 35a is formed on a portion of the flow path forming portion 35 close to the cylindrical accommodating portion 32 and in the vicinity of the pair of hooking claws 32a. The flange portion 35a protrudes outward in the radial direction with respect to the cylindrical accommodating portion 32 and is formed in substantially a rectangular shape. Additionally, a packing 34 formed of an elastic material such as rubber or the like is mounted on the cylindrical accommodating portion 32 side of the flange portion 35a.

The packing 34 is sandwiched between the vehicle body 12 and the flange portion 35a in a state (refer to FIG. 1) in which the washer nozzle 30 is fixed to the vehicle body 12. Accordingly, entry of water into the vehicle body 12 is prevented. Further, rattling of the washer nozzle 30 with respect to the vehicle body 12 is minimized, and a painted surface of the vehicle body 12 is also protected.

The main body portion 31 includes the flow path forming portion 35 in addition to the cylindrical accommodating portion 32. The flow path FP is formed inside the flow path forming portion 35, and an inflow hole 35b is formed on the upstream side of the flow path FP. The inflow hole 35b forms an inflow portion in the disclosure, and a cross section thereof is formed in substantially a circular shape. Additionally, the cleaning liquid W which has passed through the check valve 33 flows in the inflow hole 35b. In addition, the cleaning liquid W flowing through the inflow hole 35b is discharged toward the inside of the cover member 40.

A valve downstream hole 35c extending in an extending direction of the joint member 50 is formed inside a portion of the flow path forming portion 35 close to the cylindrical accommodating portion 32 and in which the flange portion 35a is provided. The valve downstream hole 35c is disposed on a downstream side of the check valve 33, and an upstream side of the inflow hole 35b is connected on a downstream side of the valve downstream hole 35c. Additionally, the inflow hole 35b is inclined at an angle of approximately 120° with respect to the valve downstream hole 35c. Accordingly, the cleaning liquid W flowing into the valve downstream hole 35c is directed to the inside of the cover member 40 due to the inflow hole 35b.

Further, a discharge port 35d which discharges the cleaning liquid W flowing through the flow path FP outside of the flow path forming portion 35 is provided on a downstream side of the flow path FP. The discharge port 35d forms a discharge portion in the disclosure, and a cross section thereof is formed in substantially a U shape. That is, the flow path FP is provided between the inflow hole 35b and the discharge port 35d of the flow path forming portion 35 in the main body portion 31.

As shown in FIGS. 3 and 4A and 4B, the flow path forming portion 35 has a cross section formed in substantially a U shape and includes a bottom wall portion 35e and a pair of side wall portions 35f. Additionally, the opening portion 35g is formed on a side of the flow path forming portion 35 opposite to a side on which the bottom wall portion 35e is formed. Here, as shown in FIG. 3, a portion of the opening portion 35g excluding the vicinity of the discharge port 35d in the longitudinal direction, that is, a part of the opening portion 35g is closed by the cover member 40.

The bottom wall portion 35e includes a flat wall portion 35e1 and a stepped wall portion 35e2. The flat wall portion 35e1 is provided on the upstream side of the flow path FP and at a portion of the cover member 40 facing a straightening rib 41c (refer to FIG. 5B). On the other hand, the stepped wall portion 35e2 is provided on the downstream side of the flow path FP and at a portion closer to the discharge port 35d. The stepped wall portion 35e2 is formed in a stepped shape in a flowing direction of the cleaning liquid W and is formed by a stepped portion G having a total of six steps (refer to FIG. 3).

The stepped portion G forming the stepped wall portion 35e2 has a plurality of stepped surfaces DF (refer to FIGS. 4A and 4B) with which the cleaning liquid W flowing from the upstream side of the flow path FP collides (impacts). Thus, when the cleaning liquid W collides with the plurality of stepped surfaces DF, a flow width of the cleaning liquid W, that is, a width in a direction intersecting a flow direction of the cleaning liquid W is widened in a width direction of the stepped wall portion 35e2. Therefore, the cleaning liquid W spreads and flows fully in the width direction of the stepped wall portion 35e2.

Further, when the cleaning liquid W collides with the plurality of stepped surfaces DF, a flow velocity of the cleaning liquid W is reduced. Therefore, scattering of the cleaning liquid W to a portion other than the in-vehicle camera 20 from the discharge port 35d is minimized. In this way, the stepped wall portion 35e2 has a function of reducing the flow velocity of the cleaning liquid W flowing from the upstream side of the flow path FP and uniformly discharging the cleaning liquid W from the entire opening portion of the discharge port 35d without unevenness.

Here, as shown in FIG. 4B, a width dimension WL of the discharge port 35d is set to be slightly larger than ⅔ of a diameter dimension D (refer to FIG. 1) of the imaging lens 22 (WL>2×D/3). As a result, the cleaning liquid W uniformly discharged from the entire opening portion of the discharge port 35d without unevenness is evenly distributed to substantially the entire surface (substantially the entire area) of the imaging lens 22. The width dimension WL of the discharge port 35d may be at least ⅔ of the diameter dimension D of the imaging lens 22, and thus even if attached matter such as water droplets remain on the imaging lens 22, the attached matter does not enter the angle of view.

However, when the width dimension WL of the discharge port 35d is increased to be equal to or larger than the diameter dimension D of the imaging lens 22 (WL≥D), a size of the washer nozzle 30 is increased. Therefore, it is preferable that the width dimension WL of the discharge port 35d be as small as possible while sufficient cleaning of the imaging lens 22 is caused.

Therefore, in the embodiment, the width dimension WL of the discharge port 35d is set to be slightly larger than ⅔ of the diameter dimension D of the imaging lens 22. Further, since the width dimension WL of the discharge port 35d is set to be slightly larger than ⅔ of the diameter dimension D of the imaging lens 22, it is possible to evenly discharge the cleaning liquid W from the entire opening portion of the discharge port 35d without unevenness even when a flow rate of the cleaning liquid W is small without increasing a discharge capacity of the washer pump P.

Furthermore, the flow path forming portion 35 is formed so that a depth dimension thereof on the upstream side of the flow path FP is deeper than that on the downstream side of the flow path FP. Additionally, in the vicinity of the discharge port 35d, the depth dimension of the flow path forming portion 35 becomes gradually shallower toward the downstream side of the flow path FP. In other words, a height dimension of the pair of side wall portions 35f is lower on the downstream side of the flow path FP than on the upstream side of the flow path FP.

Also, as shown in FIG. 3, substantially a half (about three steps) of the stepped wall portion 35e2 on the upstream side of the flow path FP is closed by a splash prevention wall 43 of the cover member 40. On the other hand, substantially a half (about three steps) of the stepped wall portion 35e2 on the downstream side of the flow path FP is exposed to the outside.

Therefore, as shown in FIG. 1, the other side of the washer nozzle 30 in the longitudinal direction has a tapered shape so that it can be easily disposed at a portion of the minute gap SG between the camera body 21 and the rear garnish 11 and in the vicinity of the imaging lens 22.

Here, in the flow path forming portion 35 on the downstream side of the flow path FP, a rigidity thereof becomes weaker as the height dimension of the pair of side wall portions 35f becomes lower. However, in the embodiment, the stepped wall portion 35e2 is provided in the flow path forming portion 35 on the downstream side of the flow path FP. Therefore, the stepped wall portion 35e2 serves as a reinforcing rib, and the flow path forming portion 35 on the downstream side of the flow path FP has sufficient rigidity.

As shown in FIGS. 4A and 4B, the pair of side wall portions 35f respectively protrude from both sides of the bottom wall portion 35e in the width direction. That is, base ends of the pair of side wall portions 35f are connected to be integrated with both sides of the bottom wall portion 35e in the width direction. Therefore, both sides of the bottom wall portion 35e of the stepped wall portion 35e2 in the width direction are also respectively connected to the pair of side wall portions 35f. Thus, there are no grooves, gaps, or the like, through which the cleaning liquid W can flow, between the stepped wall portion 35e2 and the pair of side wall portions 35f. Accordingly, it is possible to uniformly discharge the cleaning liquid W from the entire opening portion of the discharge port 35d without unevenness.

Two engaging protrusions 35h are provided on an outer side of each of the pair of side wall portions 35f, that is, on a side of each of the pair of side wall portions 35f opposite to the flow path FP side. Engaging recessed portions 42a (refer to FIGS. 5A and 5B) of the cover member 40 are engaged with the engaging protrusions 35h. Therefore, it is possible to easily fix the cover member 40 to the main body portion 31 with a single touch without using an adhesive or the like.

Further, positioning convex portions 35k which protrude in a protruding direction of the side wall portion 35f are respectively provided on the pair of side wall portions 35f. These positioning convex portions 35k have a function of positioning the cover member 40 at a predetermined position on the main body portion 31. Specifically, the cover member 40 can be positioned with respect to the main body portion 31 by aligning a pair of positioning concave portions 44 provided in the cover member 40 with the pair of positioning convex portions 35k, respectively. Therefore, it is possible to easily engage the engaging recessed portion 42a with the engaging protrusion 35h.

As shown in FIGS. 2A and 2B, 3 and 5A and 5B, the cover member 40 is formed into substantially a rectangular flat plate shape by injection molding of molten plastic or the like. Additionally, the cover member 40 includes a cover main body 41, four fixing legs 42, and the splash prevention wall 43.

As shown in FIG. 5A, a front side (outer side) of the cover main body 41 is a smooth surface 41a. On the other hand, as shown in FIG. 5B, an enclosing wall 41b which protrudes in a thickness direction of the cover main body 41 is formed on a back side (inner side) of the cover main body 41. The enclosing wall 41b includes a pair of long side wall portions 41b1 disposed to face each other, and a first short side wall portion 41b2 and a second short side wall portion 41b3 disposed to face each other. Among the pair of short side wall portions 41b2 and 41b3, the first short side wall portion 41b2 is disposed near the splash prevention wall 43.

The pair of long side wall portions 41b1 respectively protrude straightly in the thickness direction of the cover main body 41 to form engaging ribs in the disclosure. That is, these long side wall portions 41b1 are provided in a portion of the cover member 40 facing the bottom wall portion 35e in a state in which the washer nozzle 30 is assembled and protrude toward the bottom wall portion 35e (refer to FIG. 3). Furthermore, the pair of long side wall portions 41b1 are engaged with the pair of side wall portions 35f, respectively (refer to FIG. 3). Therefore, the cover member 40 does not rattle with respect to the main body portion 31.

Also, inclined surfaces TP1 and TP2 are provided on the inside of the enclosing wall 41b of the pair of short side wall portions 41b2 and 41b3, respectively. Among these inclined surfaces TP1 and TP2, the inclined surface TP1 of the first short side wall portion 41b2 forms a flow direction changing portion in the disclosure. That is, the inclined surface TP1 is designed to direct the flow direction of the cleaning liquid W flowing along the inside of the cover member 40 (inside of the enclosing wall 41b) to the stepped wall portion 35e2 formed by the stepped portion G having a total of six steps (refer to FIG. 3).

Both sides of the inclined surface TP1 in the width direction of the bottom wall portion 35e are integrally connected to the pair of long side wall portions 41b1, respectively. Therefore, there are no grooves, gaps, or the like through which the cleaning liquid W can flow between the two sides of the inclined surface TP1 in the width direction of the bottom wall portion 35e and the pair of long side wall portions 41b1. Thus, all the cleaning liquid W flowing along the inside of the enclosing wall 41b can be directed to the stepped wall portion 35e2.

Furthermore, as shown in FIG. 5B, a total of three straightening ribs 41c are provided inside the enclosing wall 41b. That is, these straightening ribs 41c are provided in a portion of the cover member 40 facing the bottom wall portion 35e. Additionally, these straightening ribs 41c extend straightly in the extending direction of the long side wall portion 41b1 forming the enclosing wall 41b and are disposed so that the cleaning liquid W flowing along the inside of the enclosing wall 41b is directed in a straight line to the inclined surface TP1.

In this way, since a total of three straightening ribs 41c are provided on the inner side of the enclosing wall 41b (the back side of the cover main body 41), the cleaning liquid W discharged from the inflow hole 35b and reaching the vicinity of the second short side wall portion 41b3 of the cover member 40 flows straightly (straightens) toward the inclined surface TP1, as shown in FIG. 3. At that time, the cleaning liquid W which has reached the inside of the enclosing wall 41b can be dispersed and spread in the width direction inside the enclosing wall 41b (the direction intersecting the extending direction of the straightening rib 41c) by each of the straightening ribs 41c. Therefore, it is possible to direct the cleaning liquid W to the stepped wall portion 35e2 in a state in which a flow width of the cleaning liquid W is widened.

The cleaning liquid W discharged from the inflow hole 35*b* reaches the vicinity of the inclined surface TP2 of the second short side wall portion 41*b*3, but there are no grooves or gaps, or the like through which the cleaning liquid W can flow even between the both sides of the inclined surface TP2 in the width direction of the bottom wall portion 35*e* and the pair of long side wall portions 41*b*1. Therefore, the cleaning liquid W which has reached the vicinity of the inclined surface TP2 does not leak out to the outside of the enclosing wall 41*b*.

Further, although some of the cleaning liquid W spread in the width direction inside the enclosing wall 41*b* by the three straightening ribs 41*c* may be thought to be able to leak outside of the enclosing wall 41*b*, this is prevented by the pair of the long side wall portions 41*b*1. Therefore, leakage of the cleaning liquid W to the outside of the washer nozzle 30 can be prevented without providing a sealing member between the cover member 40 and the main body portion 31 to seal therebetween or welding the cover member 40 to the main body portion 31 so that there is no gap therebetween.

Further, the rigidity of the cover main body 41 is enhanced by providing the enclosing wall 41*b* or the three straightening ribs 41*c* in the cover main body 41. Therefore, the cover member 40 can be pressed with a comparatively strong force when the cover member 40 is mounted on the main body portion 31, and thus the cover member 40 and the main body portion 31 can be reliably fixed to each other.

Also, as shown in FIGS. 5A and 5B, the fixing legs 42 are integrally provided at four corners of the cover main body 41, respectively. These four fixing legs 42 (a total of four) respectively protrude to the enclosing wall 41*b* side of the cover main body 41. Additionally, a protruding height of these fixing legs 42 is higher than a protruding height of the enclosing wall 41*b*.

Further, the engaging recessed portions 42*a* which open in a substantially rectangular shape are provided in portions near tip ends of the four fixing legs 42, respectively. These engaging recessed portions 42*a* open in a plate thickness direction of the fixing legs 42, and each of the engaging recessed portions 42*a* are engaged with the engaging protrusions 35*h* (refer to FIGS. 4A and 4B) provided in the flow path forming portion 35. Therefore, the cover member 40 is fixed to the main body portion 31 without rattling, and the pair of long side wall portions 41*b*1 are engaged with the pair of side wall portions 35*f*, respectively.

In addition, the splash prevention wall 43 is integrally provided on a portion of the cover main body 41 close to the first short side wall portion 41*b*2 in the longitudinal direction. As shown in FIG. 3, the splash prevention wall 43 is inclined at a predetermined angle along an inclination of the stepped wall portion 35*e*2 with respect to the cover main body 41. Additionally, a length dimension of the splash prevention wall 43 from the cover main body 41 is substantially a half of a length dimension of the stepped wall portion 35*e*2. Here, the splash prevention wall 43 prevents the cleaning liquid W flowing through the flow path FP and reaching the stepped wall portion 35*e*2 from the inclined surface TP1 from rebounding and leaking out to the outside of the flow path forming portion 35.

Further, as shown in FIGS. 5A and 5B, the pair of positioning concave portions 44 are provided between the cover main body 41 and the splash prevention wall 43. These positioning concave portions 44 are disposed on both sides of the cover main body 41 in the width direction, and the pair of positioning convex portions 35*k* (refer to FIG. 2A) provided in the flow path forming portion 35 enter these positioning concave portions 44. Additionally, an engaged state between the positioning concave portions 44 and the positioning convex portions 35*k* can be visually checked from the outside as shown in FIG. 2A. Therefore, the cover member 40 can be easily mounted on the main body portion 31 by aligning the positioning concave portions 44 with the positioning convex portions 35*k*, respectively.

Next, an operation of the washer nozzle 30 formed as described above, in particular, a flow state of the cleaning liquid W will be described in detail with reference to the drawings.

First, as shown in FIG. 1, when the washer pump P is driven, the cleaning liquid W stored in the washer tank T is delivered to the inside of the washer tube 15. Then, the cleaning liquid W flows through the inside of the joint member 50, as indicated by a bold arrow (1) in FIG. 6. Then, a pressure on the upstream side of the check valve 33 rises, and the check valve 33 opens. Thus, the cleaning liquid W flows into the inflow hole 35*b* through the valve downstream hole 35*c*. The discharge capacity of the washer pump P is much lower than that of a washer device used in an ordinary wiper device and does not inject the cleaning liquid W vigorously.

Thereafter, the cleaning liquid W flowing through the inflow hole 35*b* reaches the inside of the cover member 40 as indicated by a bold arrow (2) in FIGS. 6 and 7. Specifically, the cleaning liquid W reaches the three straightening ribs 41*c* inside the enclosing wall 41*b*. Additionally, the cleaning liquid W is spread in the width direction of the cover member 40 by these straightening ribs 41*c* and flows straightly toward the inclined surface TP1 in that state.

Next, the flow direction of the cleaning liquid W which has reached the inclined surface TP1 is directed to the stepped wall portion 35*e*2 forming the bottom wall portion 35*e*, as indicated by a bold arrow (3) in FIGS. 6 and 7. After that, as indicated by a bold arrow (4) in FIGS. 6 and 8, the cleaning liquid W which has reached the stepped wall portion 35*e*2 collides with the stepped surface DF of the stepped portion G forming the stepped wall portion 35*e*2. Then, as shown in FIG. 8, the cleaning liquid W colliding with the stepped surface DF spreads in the width direction of the stepped wall portion 35*e*2. At that time, the flow velocity of the cleaning liquid W is also reduced. Therefore, the cleaning liquid W spreads fully in the width direction of the stepped wall portion 35*e*2 and flows along the stepped wall portion 35*e*2 in that state. Additionally, the cleaning liquid W which has reached the downstream side of the stepped wall portion 35*e*2 is uniformly discharged from the entire opening portion of the discharge port 35*d* without unevenness.

Next, the cleaning liquid W uniformly discharged from the entire opening portion of the discharge port 35*d* without unevenness flows along a side surface of the camera body 21 of the in-vehicle camera 20 as indicated by a bold arrow (5) of FIG. 6 and then flows along a surface (cleaning surface) of the imaging lens 22. At this time, since the width dimension WL (refer to FIG. 4B) of the discharge port 35*d* is set to be slightly larger than ⅔ of the diameter dimension D of the imaging lens 22, the cleaning liquid W spreads over substantially the entire surface of the imaging lens 22.

Accordingly, water droplets or the like attached on the surface of the imaging lens 22 are cleanly removed, and thus a clear image can be taken by the in-vehicle camera 20.

As described above in detail, according to the washer nozzle 30 of the first embodiment, since the plurality of stepped portions G (the stepped wall portions 35*e*2) formed in a stepped shape in the flow direction of the cleaning liquid W are provided in the flow path FP between the inflow hole 35b and the discharge port 35d in the main body portion 31, it is possible to spread the cleaning liquid W in the width direction of the flow path FP by causing the cleaning liquid W flowing from the upstream side to collide with the stepped surfaces DF of the plurality of stepped portions G one after another.

Therefore, even when the flow rate of the cleaning liquid W is small, without increasing the discharge capacity of the washer pump P, it is possible to disperse the cleaning liquid W fully in the width direction of the flow path FP, and furthermore it is possible to uniformly discharge the cleaning liquid W to substantially the entire surface of the imaging lens 22.

Further, according to the washer nozzle 30 according to the first embodiment, since the plurality of stepped portions G are provided on the downstream side of the flow path FP, it is possible to adjust the flow state of the cleaning liquid W in the vicinity of an outlet portion of the flow path FP. Therefore, it is possible to more uniformly discharge the cleaning liquid W from the entire opening portion of the discharge port 35d without unevenness.

Further, according to the washer nozzle 30 according to the first embodiment, the main body portion 31 includes the bottom wall portion 35e having the plurality of stepped portions G, and the pair of side wall portions 35f protruding from both sides of the bottom wall portion 35e in the width direction, and the opening portion 35g is provided on the side thereof opposite to the side on which the bottom wall portion 35e is provided. Therefore, the main body portion 31 can be formed into a shape which facilitates die cutting and thus can be easily formed by injection molding using upper and lower dies. Therefore, manufacturing costs can be reduced.

Further, according to the washer nozzle 30 according to the first embodiment, since both sides of the plurality of stepped portions G in the width direction of the bottom wall portion 35e are respectively connected to the pair of side wall portions 35f, there are no grooves or gaps, or the like through which the cleaning liquid W can flow between the stepped wall portion 35e2 and the pair of side wall portions 35f. Therefore, it is possible to uniformly discharge the cleaning liquid W from the entire opening portion of the discharge port 35d without unevenness.

Further, according to the washer nozzle 30 according to the first embodiment, the opening portion 35g is closed by the cover member 40, and the inclined surface TP1 which directs the flow direction of the cleaning liquid W flowing along the cover member 40 to the plurality of stepped portions G is provided on the cover member 40. Therefore, all the cleaning liquid W flowing through the flow path FP can be guided to the stepped wall portion 35e2, and substantially the entire surface of the imaging lens 22 can be cleaned efficiently even when the flow rate of the cleaning liquid W is small.

Further, according to the washer nozzle 30 according to the first embodiment, the plurality of straightening ribs 41c which direct the cleaning liquid W flowing along the cover member 40 toward the inclined surface TP1 is provided in the portion of the cover member 40 opposite to the bottom wall portion 35e. Therefore, the cleaning liquid W flowing along the inside of the enclosing wall 41b can be directed in a straight line to the inclined surface TP1. Also, the rigidity of the cover main body 41 can be enhanced by the plurality of straightening ribs 41c.

Further, according to the washer nozzle 30 according to the first embodiment, the pair of long side wall portions 41b1 which protrude toward the bottom wall portion 35e and are engaged with the pair of side wall portions 35f are provided in the portion of the cover member 40 opposite to the bottom wall portion 35e, and both sides of the inclined surface TP1 in the width direction of the bottom wall portion 35e are respectively connected to the pair of long side wall portions 41b1. Therefore, it is possible to direct all the cleaning liquid W flowing along the inside of the enclosing wall 41b to the stepped wall portion 35e2.

Further, since the discharge port 35d is disposed at the rear side of the imaging lens 22 in an imaging direction of the in-vehicle camera 20, it is possible to prevent the other side (the discharge port 35d side) of the washer nozzle 30 in the longitudinal direction from entering the angle of view of the imaging lens 22.

Further, according to the washer nozzle 30 according to the first embodiment, since the width dimension WL of the discharge port 35d is equal to or larger than ⅔ of the diameter dimension D of the imaging lens 22, the cleaning liquid W uniformly discharged from the entire opening portion of the discharge port 35d without unevenness can be evenly spread over substantially the entire surface of the imaging lens 22.

Next, a second embodiment of the disclosure will be described in detail with reference to the drawings. Parts having the same functions as those of the above-described first embodiment are designated by the same reference numerals, and a detailed description thereof will be omitted.

Figure 10:
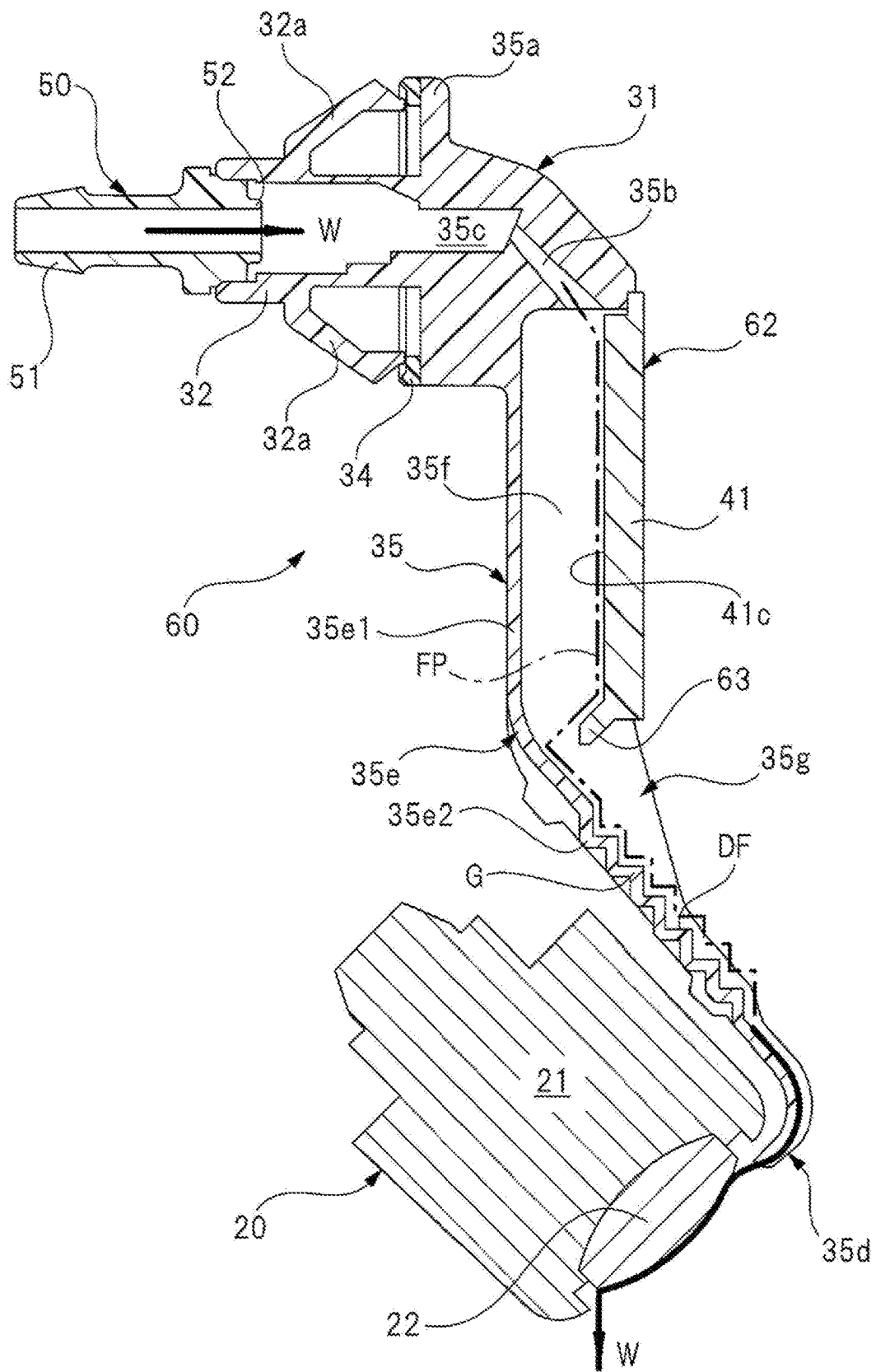
FIG. 10 is a cross-sectional view corresponding to FIG. 3 which shows the washer nozzle of FIGS. 9A and 9B.
Figure 11A:
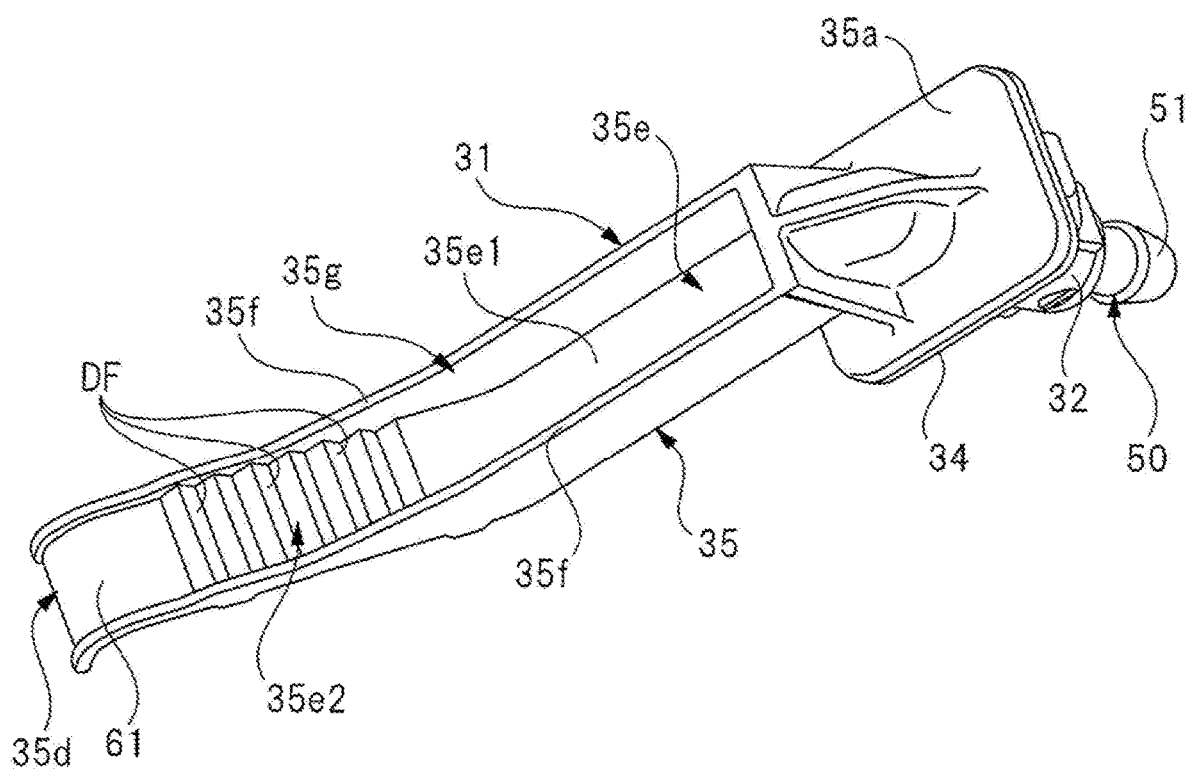
FIGS. 11A and 11B are perspective views corresponding to FIGS. 4A and 4B which show a main body portion of FIG. 10 as a single body.
Figure 11B:
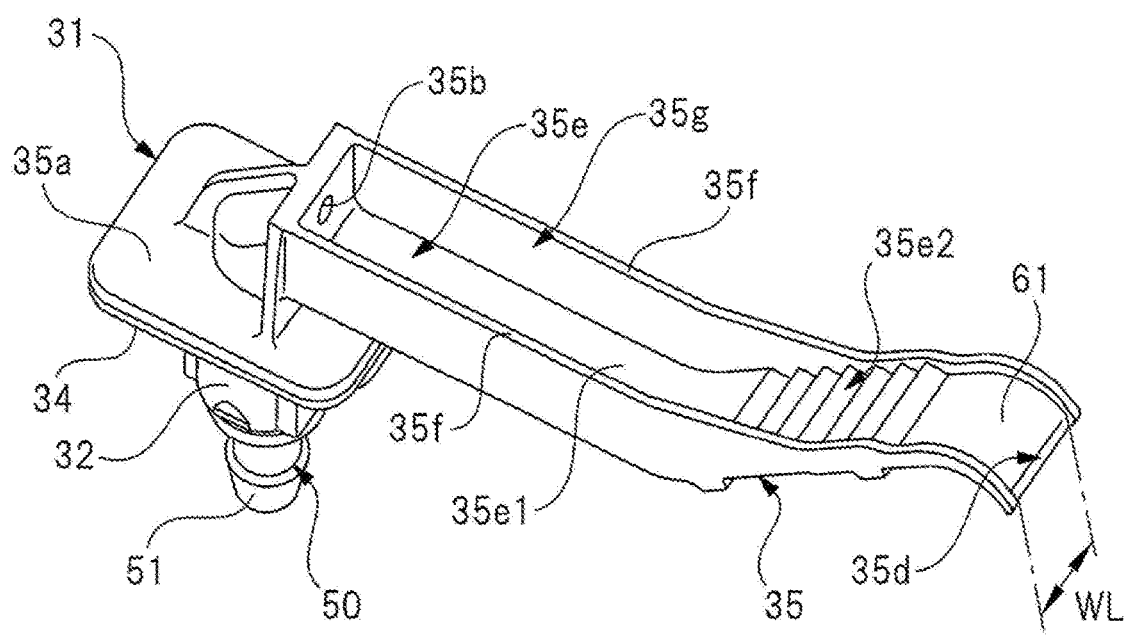
Figure 12A:
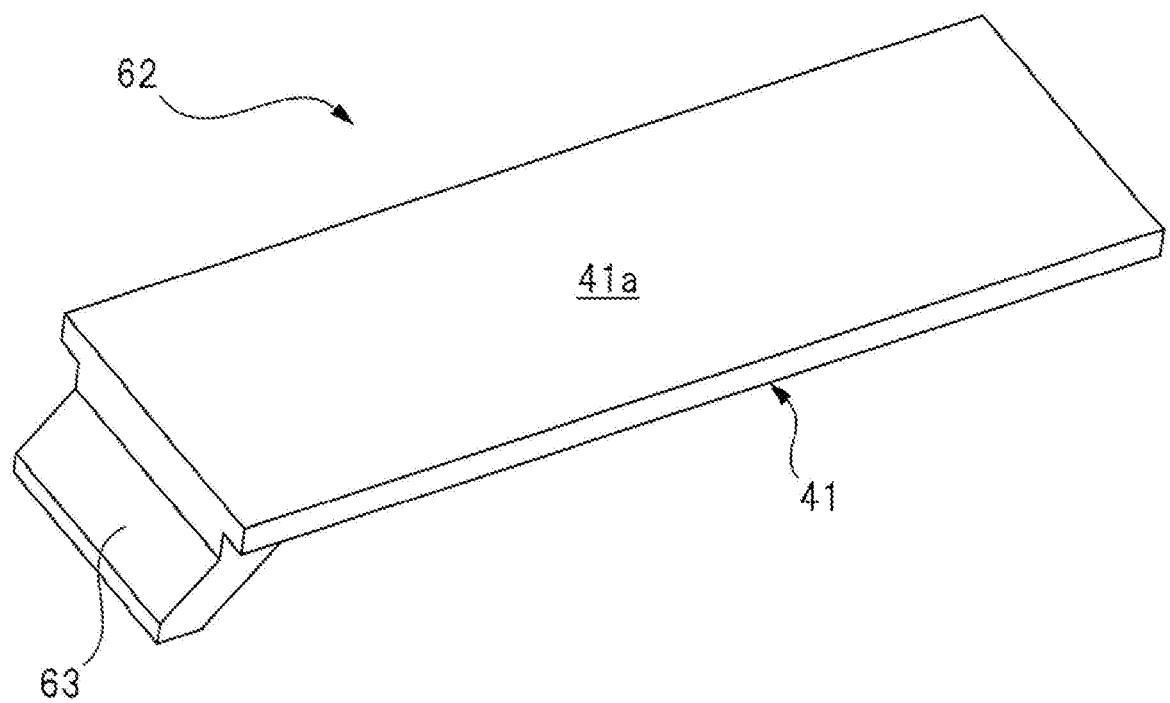
FIGS. 12A and 12B are perspective views corresponding to FIGS. 5A and 5B which show a cover member of FIG. 10 as a single body.
Figure 12B:
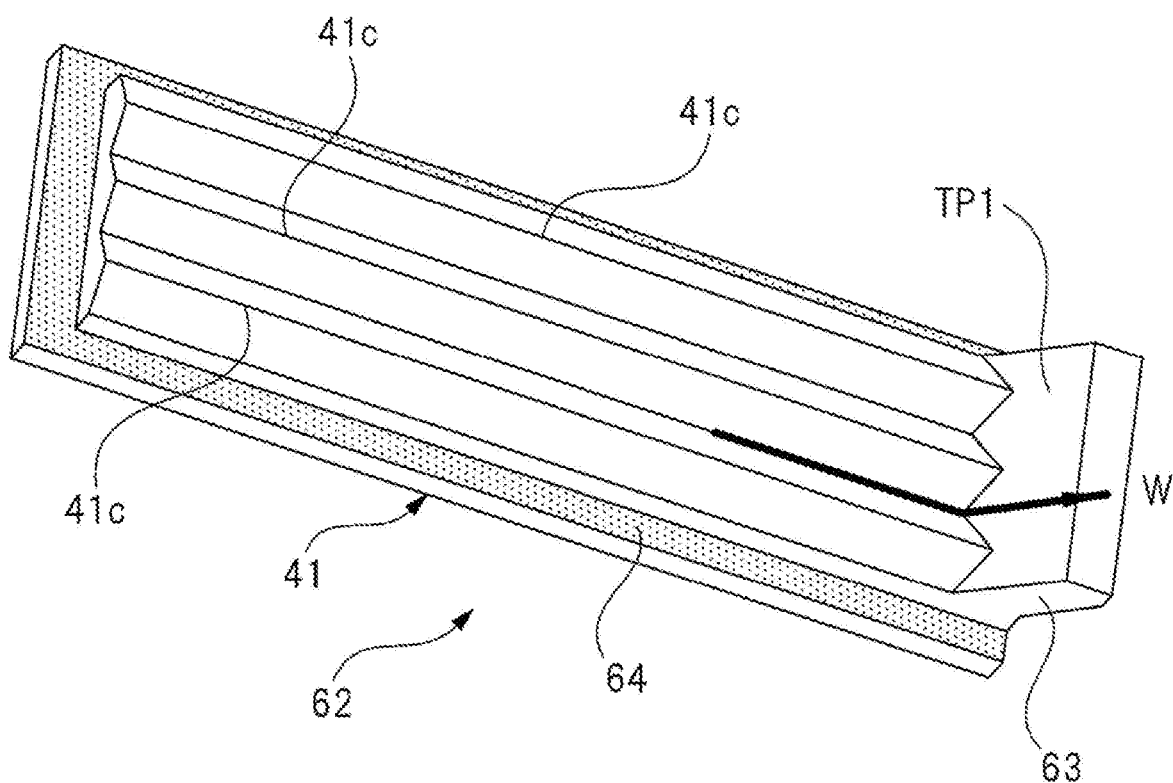

FIGS. 9A and 9B are perspective views corresponding to FIGS. 2A and 2B which show a washer nozzle according to the second embodiment, FIG. 10 is a cross-sectional view corresponding to FIG. 3 which shows the washer nozzle of FIGS. 9A and 9B, FIGS. 11A and 11B are perspective views corresponding to FIGS. 4A and 4B which show a main body portion of FIG. 10 as a single body, and FIGS. 12A and 12B are perspective views corresponding to FIGS. 5A and 5B which show a cover member of FIG. 10 as a single body.

As shown in FIGS. 9A and 9B to 12A and 12B, a washer nozzle 60 according to the second embodiment has a simplified structure as a whole when compared with the washer nozzle 30 (refer to FIGS. 2A and 2B to 5A and 5B) of the first embodiment.

Specifically, in the washer nozzle 60, the engaging protrusion 35h (refer to FIGS. 4A and 4B) of the flow path forming portion 35 is eliminated. On the other hand, a tongue piece portion 61 is additionally provided on the other side of the main body portion 31 in the longitudinal direction. The tongue piece portion 61 has substantially an arcuate cross section and allows the cleaning liquid W (refer to FIG. 10) flowing along the stepped wall portion 35e2 to directly reach the imaging lens 22 without going through the camera body 21. Therefore, it is not necessary to wet the camera body 21 with the cleaning liquid W. In the washer nozzle 60, the discharge port 35d is provided at a tip end of the tongue piece portion 61.

Also, the pair of hooking claws 32a provided on the outer side of the cylindrical accommodating portion 32 in the radial direction are disposed at positions shifted by 90° from those of the washer nozzle 30 of the first embodiment. That is, as shown in FIGS. 9A and 9B, the pair of hooking claws 32a of the washer nozzle 60 are provided side by side in the longitudinal direction of the main body portion 31. Furthermore, the check valve 33 (refer to FIG. 3) inside the cylindrical accommodating portion 32 is also eliminated. Also, the positioning convex portions 35k (refer to FIGS. 4A and 4B) of the pair of side wall portions 35f are also eliminated.

Further, in a cover member 62 of the washer nozzle 60, as shown in FIGS. 12A and 12B, the enclosing wall 41b is eliminated, the four fixing legs 42 are also eliminated, and the splash prevention wall 43 is also eliminated, as compared with the washer nozzle 30 of the first embodiment (refer to FIGS. 5A and 5B, respectively). On the other hand, an inclined wall 63 having the inclined surface TP1 which directs the cleaning liquid W (refer to FIG. 12B) flowing along the straightening rib 41c of the cover main body 41 toward the stepped wall portion 35e2 (refer to FIGS. 11A and 11B) is provided. Here, the inclined wall 63 is disposed to be sandwiched between the pair of side wall portions 35f.

Additionally, the cover member 62 of the washer nozzle 60 according to the second embodiment is closely contacted with (sealed to) the opening portion 35g (refer to FIGS. 11A and 11B) of the flow path forming portion 35 in the main body portion 31 by an adhesive (not shown). Here, the adhesive is applied to an outer edge portion 64 of the cover main body 41 indicated by a shaded portion in FIG. 12B. Thus, the cleaning liquid W is prevented from leaking out from the inside of the flow path forming portion 35 to the outside thereof.

Also in the second embodiment formed as described above, like the first embodiment, even when the flow rate of the cleaning liquid W is small, without increasing the discharge capacity of the washer pump P, it is possible to disperse the cleaning liquid W fully in the width direction of the flow path FP, and furthermore it is possible to evenly discharge the cleaning liquid W to substantially the entire surface of the imaging lens 22.

In addition, in the second embodiment, since shapes of components forming the washer nozzle 60 can be simplified, manufacturing costs can be reduced, and a size and a weight can also be reduced. Further, since the tongue piece portion 61 is provided on the other side of the washer nozzle 60 in the longitudinal direction so that the cleaning liquid W directly reaches the imaging lens 22, it is possible to reliably guide the cleaning liquid W to a place to be cleaned. In addition, it is not necessary to wet the camera body 21 with the cleaning liquid W, and durability of the in-vehicle camera 20 can be improved.

Next, a third embodiment of the disclosure will be described in detail with reference to the drawings. Parts having the same functions as those of the above-described first embodiment are designated by the same reference numerals, and a detailed description thereof will be omitted.

Figure 13:
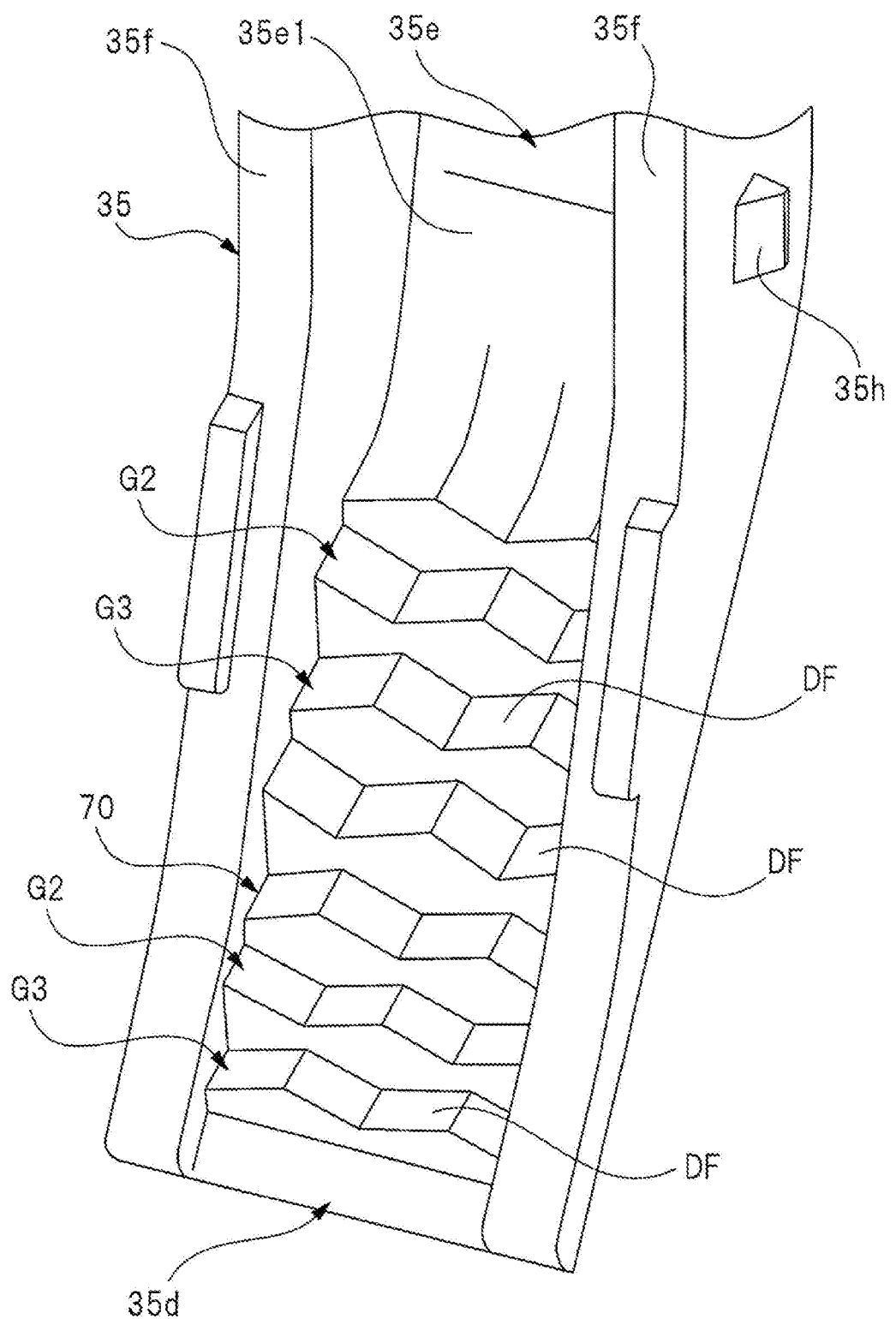
FIG. 13 is a perspective view showing a stepped portion of a washer nozzle according to a third embodiment.

FIG. 13 is a perspective view showing a stepped portion of a washer nozzle according to the third embodiment.

As shown in FIG. 13, the third embodiment is different from the first embodiment only in a shape of a stepped wall portion 70 forming the bottom wall portion 35e of the flow path forming portion 35. Specifically, in the first embodiment, as shown in FIG. 8, the stepped surface DF of the stepped portion G forming the stepped wall portion 35e2 is a flat surface extending straightly in the direction intersecting the longitudinal direction of the flow path forming portion 35.

On the other hand, in the third embodiment, the stepped wall portion 70 is formed by a first stepped portion (stepped portion) G2 and a second stepped portion (stepped portion) G3. However, the number of steps is six like the first embodiment. Additionally, stepped surfaces DF of the first and second stepped portions G2 and G3 are formed in a concavo-convex shape in a direction intersecting the longitudinal direction of the flow path forming portion 35. More specifically, in the first stepped portion G2, a central portion and both ends thereof protrude in an extending direction of the stepped surface DF, and in the second stepped portion G3, a central portion and both ends thereof are recessed in the extending direction of the stepped surface DF. Further, the first stepped portion G2 and the second stepped portion G3 are alternately disposed in the longitudinal direction of the flow path forming portion 35.

Also in the third embodiment formed as described above, like the first embodiment, even when the flow rate of the cleaning liquid W is small, without increasing the discharge capacity of the washer pump P, it is possible to disperse the cleaning liquid W fully in the width direction of the flow path FP, and furthermore it is possible to evenly discharge the cleaning liquid W to substantially the entire surface of the imaging lens 22.

In addition, in the third embodiment, since the stepped surfaces DF of the first and second stepped portions G2 and G3 are formed in a concavo-convex shape in the direction intersecting the longitudinal direction of the flow path forming portion 35 and the first and second stepped portions G2 and G3 are disposed alternately in the longitudinal direction of the flow path forming portion 35, the cleaning liquid W flowing along the stepped wall portion 70 can be moved greatly in the width direction of the stepped wall portion 70. Therefore, the cleaning liquid W can be spread more effectively in the width direction of the stepped wall portion 70.

It is needless to say that the disclosure is not limited to each of the above-described embodiments and various modifications can be made without departing from the gist thereof. For example, in each of the above embodiments, a washer nozzle which cleans an imaging lens of an in-vehicle camera located at the rear of a vehicle such as an automobile has been described, but the disclosure is not limited thereto. For example, it can be adopted for a washer nozzle which cleans an imaging lens such as a surveillance camera.

Further, minute concavo-convex portions may be provided in the stepped portion G and the discharge port 35d, the tongue piece portion 61, the first stepped portion G2, the second stepped portion G3 and so on in each of the above-described embodiments. Thereby, it is possible to reduce a surface tension of the cleaning liquid W and to allow the cleaning liquid W to flow smoothly. The minute concavo-convex portions may be formed by an embossing processing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

In another aspect of the disclosure, the plurality of stepped portions may be provided on the downstream side of the flow path.

In yet another aspect of the disclosure, the main body portion may include a bottom wall portion in which the plurality of stepped portions are provided and a pair of side wall portions which protrude from both sides of the bottom wall portion in a width direction, and an opening portion may be provided on a side opposite to a side on which the bottom wall portion is provided.

In still another aspect of the disclosure, both sides of the plurality of stepped portions in the width direction of the bottom wall portion may be respectively connected to the pair of side wall portions.

In still yet another aspect of the disclosure, the opening portion may be closed by a cover member, and a flow direction changing portion which directs a flow direction of the cleaning liquid flowing along the cover member toward the plurality of stepped portions may be provided in the cover member.

In still yet another aspect of the disclosure, a plurality of straightening ribs which direct the cleaning liquid flowing along the cover member toward the flow direction changing portion may be provided in a portion of the cover member opposite to the bottom wall portion.

In still yet another aspect of the disclosure, a pair of engaging ribs which protrude toward the bottom wall portion and are engaged with the pair of side wall portions may be provided in a portion of the cover member opposite to the bottom wall portion, and both sides of the flow direction changing portion in the width direction of the bottom wall portion may be respectively connected to the pair of engaging ribs.

In still yet another aspect of the disclosure, the object to be cleaned may be an imaging lens of an in-vehicle camera, and the discharge portion may be disposed on a rear side of the imaging lens in an imaging direction of the in-vehicle camera.

In still yet another aspect of the disclosure, a width dimension of the discharge portion may be at least ⅔ of a diameter dimension of the imaging lens.

According to the disclosure, since a plurality of stepped portions formed in a stepped shape in a flow direction of the cleaning liquid are provided in a flow path between an inflow hole and a discharge port in a main body portion, it is possible to spread the cleaning liquid in a width direction of the flow path by causing the cleaning liquid flowing from an upstream side to collide with stepped surfaces of the plurality of stepped portions one after another. Therefore, even when a flow rate of the cleaning liquid is small, without increasing a discharge capacity of a washer pump, it is possible to disperse the cleaning liquid fully in the width direction of the flow path, and it is possible to uniformly discharge the cleaning liquid to substantially the entire surface of an imaging lens.

What is claimed is:

1. A washer nozzle which supplies a cleaning liquid to an object to be cleaned, comprising:
    a main body portion having a flow path through which the cleaning liquid flows;
    an inflow portion provided on an upstream side of the flow path;
    a discharge portion provided on a downstream side of the flow path; and
    a plurality of stepped portions provided in the flow path and formed in a stepped shape in a flowing direction of the cleaning liquid;
    wherein the main body portion comprises a bottom wall portion in which the plurality of stepped portions are provided and a pair of side wall portions which protrude from two sides of the bottom wall portion in a width direction of the bottom wall portion, and an opening portion is provided on a side opposite to a side on which the bottom wall portion is provided,
    wherein the opening portion is located between the pair of side wall portions and between the inflow portion and the discharge portion, and the opening portion is closed by a cover member,
    wherein the cover member comprises a cover main body and a splash prevention wall, and the splash prevention wall is inclined in a predetermined angle along an inclination of the plurality of stepped portions with respect to the cover main body,
    wherein a flow direction changing portion which directs a flow direction of the cleaning liquid flowing along the cover member toward the plurality of stepped portions is provided in the cover member,
    wherein a plurality of straightening ribs which direct the cleaning liquid flowing along the cover member toward the flow direction changing portion are provided in a portion of the cover member opposite to the bottom wall portion.

2. The washer nozzle according to claim 1, wherein the plurality of stepped portions are provided on the downstream side of the flow path.

3. The washer nozzle according to claim 1, wherein two sides of the plurality of stepped portions in the width direction of the bottom wall portion are respectively connected to the pair of side wall portions.

4. The washer nozzle according to claim 1, wherein a pair of engaging ribs which protrude toward the bottom wall portion and are engaged with the pair of side wall portions are provided in a portion of the cover member opposite to the bottom wall portion, and
    two sides of the flow direction changing portion in the width direction of the bottom wall portion are respectively connected to the pair of engaging ribs.

5. The washer nozzle according to claim 1, wherein the object to be cleaned is an imaging lens of an in-vehicle camera, and
    the discharge portion is disposed on a rear side of the imaging lens in an imaging direction of the in-vehicle camera, wherein the imaging direction is a direction that the imaging lens is capable of imaging view.

6. The washer nozzle according to claim 5, wherein a width dimension of the discharge portion is at least ⅔ of a diameter dimension of the imaging lens.

* * * * *